US011328738B2

(12) United States Patent
Richards et al.

(10) Patent No.: US 11,328,738 B2
(45) Date of Patent: *May 10, 2022

(54) SYSTEMS AND METHODS FOR AUTOMATIC DETERMINATION OF INFANT CRY AND DISCRIMINATION OF CRY FROM FUSSINESS

(71) Applicant: LENA Foundation, Boulder, CO (US)

(72) Inventors: Jeffrey A. Richards, Boulder, CO (US); Stephen M. Hannon, Arvada, CO (US)

(73) Assignee: LENA FOUNDATION, Boulder, CO (US)

( * ) Notice: Subject to any disclaimer, the term of this patent is extended or adjusted under 35 U.S.C. 154(b) by 157 days.

This patent is subject to a terminal disclaimer.

(21) Appl. No.: 16/727,615

(22) Filed: Dec. 26, 2019

(65) Prior Publication Data

US 2020/0135229 A1 Apr. 30, 2020

Related U.S. Application Data

(63) Continuation of application No. 16/213,468, filed on Dec. 7, 2018, now Pat. No. 10,529,357.

(Continued)

(51) Int. Cl.
*G10L 25/63* (2013.01)
*G10L 25/30* (2013.01)
(Continued)

(52) U.S. Cl.
CPC .............. *G10L 25/63* (2013.01); *G10L 15/02* (2013.01); *G10L 15/04* (2013.01); *G10L 25/18* (2013.01);
(Continued)

(58) Field of Classification Search
CPC ......... G10L 25/63; G10L 15/02; G10L 15/04; G10L 25/18; G10L 25/27; G10L 25/30;
(Continued)

(56) References Cited

U.S. PATENT DOCUMENTS

| 4,087,632 A | 5/1978 | Hafer |
| 4,139,732 A | 2/1979 | Fourcin |

(Continued)

FOREIGN PATENT DOCUMENTS

| DE | 10212128 | 10/2003 |
| EP | 0896319 | 2/1999 |

(Continued)

OTHER PUBLICATIONS

Russell et al., "Applications of Automatic Speech Recognition to Speech and Language Development in Young Children," Spoken Language, 1996, ICSLP 96, Proceedings, Fourth International Conference, vol. 1, IEEE, 1996, 1996.

(Continued)

*Primary Examiner* — Disler Paul
(74) *Attorney, Agent, or Firm* — Bryan Cave Leighton Paisner LLP

(57) ABSTRACT

A method including receiving one or more datasets of audio data of a key child captured in a natural sound environment of the key child. The method also includes segmenting each of the one or more datasets of audio data to create audio segments. The audio segments include cry-related segments and non-cry segments. The method additionally includes determining periods of the cry-related segments that satisfy one or more threshold non-sparsity criteria. The method further includes performing a classification on the periods to classify each of the periods as either a cry period or a fussiness period. Other embodiments are described.

20 Claims, 11 Drawing Sheets

Related U.S. Application Data

(60) Provisional application No. 62/595,853, filed on Dec. 7, 2017.

(51) Int. Cl.
| | |
|---|---|
| G10L 25/18 | (2013.01) |
| G10L 15/04 | (2013.01) |
| G10L 15/02 | (2006.01) |
| G10L 25/27 | (2013.01) |
| H04R 29/00 | (2006.01) |

(52) U.S. Cl.
CPC .............. *G10L 25/27* (2013.01); *G10L 25/30* (2013.01); *H04R 29/00* (2013.01)

(58) Field of Classification Search
CPC ....... G10L 25/66; G10L 25/87; G10L 15/142; H04R 29/00
USPC ..................................................... 381/56–57
See application file for complete search history.

(56) References Cited

U.S. PATENT DOCUMENTS

| | | | |
|---|---|---|---|
| 4,408,616 A | 10/1983 | Duffy et al. | |
| 4,464,119 A | 8/1984 | Vildgrube et al. | |
| 4,675,904 A | 6/1987 | Silverman | |
| 4,809,332 A | 2/1989 | Jongman et al. | |
| 4,852,181 A | 7/1989 | Morito et al. | |
| 4,857,030 A | 8/1989 | Rose | |
| 4,903,304 A | 2/1990 | Schlang et al. | |
| 5,014,327 A | 5/1991 | Potter et al. | |
| 5,033,087 A | 7/1991 | Bahl et al. | |
| 5,167,004 A | 11/1992 | Netsch et al. | |
| 5,169,316 A | 12/1992 | Lorman et al. | |
| 5,260,869 A | 11/1993 | Ferrier et al. | |
| 5,459,815 A | 10/1995 | Aikawa et al. | |
| 5,479,576 A | 12/1995 | Watanabe | |
| 5,497,447 A | 3/1996 | Bahl et al. | |
| 5,572,624 A | 11/1996 | Sejnoha | |
| 5,598,507 A | 1/1997 | Kimber | |
| 5,617,855 A | 4/1997 | Waletzky et al. | |
| 5,625,749 A | 4/1997 | Goldenthal et al. | |
| 5,655,058 A | 8/1997 | Balasubramanian et al. | |
| 5,659,662 A | 8/1997 | Wilcox et al. | |
| 5,664,059 A | 9/1997 | Zhao | |
| 5,668,780 A * | 9/1997 | Hsieh ...................... | G10L 17/26 367/198 |
| 5,679,001 A | 10/1997 | Russell et al. | |
| 5,717,828 A | 2/1998 | Rothenberg | |
| 5,729,658 A | 3/1998 | Hou et al. | |
| 5,765,127 A | 6/1998 | Nishiguchi et al. | |
| 5,812,972 A | 9/1998 | Juang et al. | |
| 5,813,862 A | 9/1998 | Merzenich et al. | |
| 5,873,728 A | 2/1999 | Jeong et al. | |
| 5,878,392 A | 3/1999 | Meyer et al. | |
| 5,884,259 A | 3/1999 | Bahl et al. | |
| 5,890,113 A | 3/1999 | Takagi | |
| 5,893,720 A | 4/1999 | Cohen | |
| 5,913,188 A | 6/1999 | Tzirkel-Hancock | |
| 5,927,988 A | 7/1999 | Jenkins et al. | |
| 5,953,701 A | 9/1999 | Neti et al. | |
| 5,960,397 A | 9/1999 | Rahim | |
| 5,964,593 A | 10/1999 | Cohen | |
| 5,966,691 A | 10/1999 | Kibre et al. | |
| 5,978,759 A | 11/1999 | Tsushima et al. | |
| 6,006,188 A | 12/1999 | Bogdashevsky et al. | |
| 6,018,706 A | 1/2000 | Huang et al. | |
| 6,029,124 A | 2/2000 | Gillick et al. | |
| 6,055,498 A | 4/2000 | Neumeyer et al. | |
| 6,061,646 A | 5/2000 | Martino et al. | |
| 6,071,123 A | 6/2000 | Tallal et al. | |
| 6,073,095 A | 6/2000 | Dharanipragada et al. | |
| 6,123,548 A | 9/2000 | Tallal et al. | |
| 6,134,529 A | 10/2000 | Rothenberg | |
| 6,157,913 A | 12/2000 | Bernstein | |
| 6,173,260 B1 | 1/2001 | Slaney | |
| 6,208,970 B1 | 3/2001 | Ramanan | |
| 6,212,502 B1 | 4/2001 | Ball et al. | |
| 6,246,985 B1 | 6/2001 | Kanevsky et al. | |
| 6,253,173 B1 | 6/2001 | Ma | |
| 6,253,175 B1 | 6/2001 | Basu et al. | |
| 6,253,181 B1 | 6/2001 | Junqua | |
| 6,296,489 B1 | 10/2001 | Blass et al. | |
| 6,304,846 B1 | 10/2001 | George et al. | |
| 6,336,089 B1 | 1/2002 | Everding | |
| 6,341,267 B1 | 1/2002 | Taub | |
| 6,364,666 B1 | 4/2002 | Jenkins et al. | |
| 6,395,482 B1 | 5/2002 | Karayiorgou et al. | |
| 6,404,925 B1 | 6/2002 | Foote et al. | |
| 6,405,167 B1 | 6/2002 | Cogliano | |
| 6,468,084 B1 | 10/2002 | MacMillan | |
| 6,496,115 B2 * | 12/2002 | Arakawa ............ | G08B 21/0208 340/573.1 |
| 6,539,352 B1 | 3/2003 | Sharma et al. | |
| 6,554,617 B1 | 4/2003 | Dolan | |
| 6,584,440 B2 | 6/2003 | Litovsky | |
| 6,661,345 B1 | 12/2003 | Bevan et al. | |
| 6,662,162 B2 | 12/2003 | Casper | |
| 6,665,642 B2 | 12/2003 | Kanevsky et al. | |
| 6,676,412 B1 | 1/2004 | Masterston et al. | |
| 6,697,778 B1 | 2/2004 | Kuhn et al. | |
| 6,721,706 B1 | 4/2004 | Strubbe et al. | |
| 6,725,198 B2 | 4/2004 | Waryas et al. | |
| 6,732,076 B2 | 5/2004 | Masterson et al. | |
| 6,755,657 B1 | 6/2004 | Wasowicz | |
| 6,774,917 B1 | 8/2004 | Foote | |
| 6,807,395 B2 | 10/2004 | Iwazaki et al. | |
| 7,011,525 B2 | 3/2006 | Mejia | |
| 7,013,276 B2 | 3/2006 | Bickley et al. | |
| 7,063,535 B2 | 6/2006 | Stamm et al. | |
| 7,143,044 B2 | 11/2006 | Zadrozny et al. | |
| 7,180,892 B1 | 2/2007 | Tackin | |
| 7,184,959 B2 | 2/2007 | Gibbon et al. | |
| 7,272,559 B1 | 9/2007 | Hayre | |
| 7,275,034 B2 | 9/2007 | Odell et al. | |
| 7,295,970 B1 | 11/2007 | Gorin et al. | |
| 7,457,753 B2 | 11/2008 | Moran et al. | |
| 7,523,034 B2 | 4/2009 | Deligne et al. | |
| 7,590,513 B2 | 9/2009 | Jiang et al. | |
| 7,590,536 B2 | 9/2009 | Bates et al. | |
| 7,603,276 B2 | 10/2009 | Yoshizawa | |
| 7,627,475 B2 | 12/2009 | Petrushin | |
| 7,711,652 B2 | 5/2010 | Schmelzer | |
| 7,720,012 B1 | 5/2010 | Borah et al. | |
| 7,826,981 B2 | 11/2010 | Goode, Jr. et al. | |
| 7,914,468 B2 | 3/2011 | Shalon et al. | |
| 7,930,179 B1 | 4/2011 | Gorin et al. | |
| 8,009,193 B2 | 8/2011 | Zhou et al. | |
| 8,078,465 B2 | 12/2011 | Paul et al. | |
| 8,379,870 B2 * | 2/2013 | Nicolino, Jr. ........ | G08B 15/002 381/56 |
| 8,402,026 B2 | 3/2013 | Gallivan | |
| 8,708,702 B2 | 4/2014 | Paul | |
| 8,744,847 B2 | 6/2014 | Paul et al. | |
| 8,938,390 B2 | 1/2015 | Xu et al. | |
| 9,009,038 B2 * | 4/2015 | Hong ...................... | G10L 25/48 704/232 |
| 9,240,188 B2 | 1/2016 | Paul et al. | |
| 9,355,651 B2 | 5/2016 | Xu et al. | |
| 9,799,348 B2 | 10/2017 | Paul et al. | |
| 9,897,034 B2 * | 2/2018 | Tsugawa ................. | F02D 37/02 |
| 9,899,034 B2 | 2/2018 | Hofer et al. | |
| 9,899,037 B2 | 2/2018 | Paul et al. | |
| 10,223,934 B2 * | 3/2019 | Paul ...................... | A61B 5/4803 |
| 10,261,958 B1 * | 4/2019 | Kenthapadi ............ | G06F 16/254 |
| 10,278,637 B2 * | 5/2019 | Sheinkopf .............. | A61B 5/121 |
| 10,747,231 B2 * | 8/2020 | Akotkar ................. | G10L 21/038 |
| 2001/0044719 A1 | 11/2001 | Casey | |
| 2002/0052741 A1 | 5/2002 | Seo et al. | |
| 2002/0150869 A1 | 10/2002 | Shpiro | |
| 2002/0169583 A1 | 11/2002 | Gutta et al. | |
| 2003/0009333 A1 | 1/2003 | Sharma et al. | |
| 2003/0033145 A1 | 2/2003 | Petrushin | |

(56) References Cited

U.S. PATENT DOCUMENTS

| | | |
|---|---|---|
| 2003/0074191 A1 | 4/2003 | Byrnes et al. |
| 2003/0088565 A1 | 5/2003 | Walter et al. |
| 2003/0125099 A1 | 7/2003 | Basson |
| 2003/0144839 A1 | 7/2003 | Dharanipragada et al. |
| 2003/0171924 A1 | 9/2003 | Bi et al. |
| 2004/0019484 A1 | 1/2004 | Kobayashi et al. |
| 2004/0068406 A1 | 4/2004 | Maekawa et al. |
| 2004/0111263 A1 | 6/2004 | Nishitani et al. |
| 2004/0143434 A1 | 7/2004 | Divakaran et al. |
| 2004/0197750 A1 | 10/2004 | Donaher et al. |
| 2004/0199386 A1 | 10/2004 | Attias et al. |
| 2004/0215449 A1 | 10/2004 | Roy |
| 2004/0220493 A1 | 11/2004 | Teicher |
| 2004/0236573 A1 | 11/2004 | Sapeluk |
| 2004/0236577 A1 | 11/2004 | Nishitani et al. |
| 2005/0064375 A1 | 3/2005 | Blank |
| 2005/0096907 A1 | 5/2005 | Bacchiani et al. |
| 2005/0102135 A1 | 5/2005 | Goronzy |
| 2005/0112534 A1 | 5/2005 | McCarton et al. |
| 2005/0131688 A1 | 6/2005 | Goronzy et al. |
| 2005/0137862 A1 | 6/2005 | Monkowski |
| 2005/0142522 A1 | 6/2005 | Kullok et al. |
| 2005/0170333 A1 | 8/2005 | Vojdani |
| 2005/0176057 A1 | 8/2005 | Bremer et al. |
| 2005/0187770 A1 | 8/2005 | Kompe et al. |
| 2005/0228236 A1 | 10/2005 | Diederich et al. |
| 2005/0251532 A1 | 11/2005 | Radhakrishnan et al. |
| 2006/0020458 A1 | 1/2006 | Kwon et al. |
| 2006/0028556 A1 | 2/2006 | Bunn et al. |
| 2006/0041427 A1 | 2/2006 | Yegnanarayanan et al. |
| 2006/0052428 A1 | 3/2006 | Chez |
| 2006/0052945 A1 | 3/2006 | Rabinowitz et al. |
| 2006/0053014 A1 | 3/2006 | Yoshizawa |
| 2006/0057545 A1 | 3/2006 | Mozer et al. |
| 2006/0058998 A1 | 3/2006 | Yamamoto et al. |
| 2006/0058999 A1 | 3/2006 | Barker et al. |
| 2006/0069566 A1 | 3/2006 | Fukada |
| 2006/0074656 A1 | 4/2006 | Mathias et al. |
| 2006/0093997 A1 | 5/2006 | Kearby et al. |
| 2006/0105305 A1 | 5/2006 | Stewart |
| 2006/0136217 A1 | 6/2006 | Mullin |
| 2006/0149558 A1 | 7/2006 | Kahn et al. |
| 2006/0206724 A1 | 9/2006 | Schaufele et al. |
| 2006/0212296 A1 | 9/2006 | Espy-Wilson et al. |
| 2006/0278532 A1 | 12/2006 | Goldknopf et al. |
| 2007/0009865 A1 | 1/2007 | Palacios |
| 2007/0010998 A1 | 1/2007 | Radhakrishnan et al. |
| 2007/0055151 A1 | 3/2007 | Shertukde et al. |
| 2007/0110042 A1 | 5/2007 | Li et al. |
| 2007/0112764 A1 | 5/2007 | Yih et al. |
| 2007/0124135 A1 | 5/2007 | Schultz |
| 2007/0168187 A1 | 7/2007 | Fletcher et al. |
| 2007/0172805 A1 | 7/2007 | Paul |
| 2007/0198263 A1 | 8/2007 | Chen |
| 2007/0239441 A1 | 10/2007 | Navratil et al. |
| 2008/0045805 A1 | 2/2008 | Sarel et al. |
| 2008/0063264 A1 | 3/2008 | Porikli et al. |
| 2008/0082337 A1 | 4/2008 | Joublin et al. |
| 2008/0096172 A1 | 4/2008 | Brumfield et al. |
| 2008/0133141 A1 | 6/2008 | Frost |
| 2008/0133221 A1 | 6/2008 | Smith |
| 2008/0159560 A1 | 7/2008 | Song et al. |
| 2008/0208581 A1 | 8/2008 | Pelecanos et al. |
| 2008/0235016 A1 | 9/2008 | Paul et al. |
| 2008/0235017 A1 | 9/2008 | Satomura |
| 2008/0243503 A1 | 10/2008 | Soong et al. |
| 2009/0024050 A1 | 1/2009 | Jung et al. |
| 2009/0155751 A1 | 6/2009 | Paul et al. |
| 2009/0171661 A1 | 7/2009 | Jayadeva et al. |
| 2009/0191521 A1 | 7/2009 | Paul et al. |
| 2009/0208913 A1 | 8/2009 | Xu et al. |
| 2010/0204993 A1 | 8/2010 | Vogt |
| 2014/0234811 A1 | 8/2014 | Paul |
| 2014/0255887 A1 | 9/2014 | Xu et al. |
| 2015/0112678 A1 | 4/2015 | Binks et al. |
| 2016/0203832 A1 | 7/2016 | Paul |
| 2016/0351074 A1 | 12/2016 | Paul et al. |
| 2017/0103748 A1 | 4/2017 | Weissberg et al. |
| 2017/0125034 A1* | 5/2017 | Kakadiaris ............ G10L 25/51 |
| 2018/0174601 A1 | 6/2018 | Paul et al. |
| 2018/0307753 A1* | 10/2018 | Guo ................. G06F 16/638 |
| 2018/0317876 A1* | 11/2018 | Emmanouilidou .... G06N 99/00 |

FOREIGN PATENT DOCUMENTS

| | | |
|---|---|---|
| EP | 2248077 | 11/2010 |
| WO | 1994010666 | 5/1994 |
| WO | 200070584 | 11/2000 |
| WO | 2006034029 | 3/2006 |
| WO | 2009094039 | 7/2009 |
| WO | 2017112261 | 6/2017 |

OTHER PUBLICATIONS

Franco et al., "The SRI EduSpeakTM System: Recognition and Pronunciation Scoring for Language Learning," Proceedings of InSTILL 2000 (2000): 123-128, 2000.

Hazan et al., "The Development of Phonemic, Categorization in Children Aged 6-12," Journal of Phonetics, 28.4 (2000): 377-396, 2000.

Shahin et al., "Tabby Talks: An Automated Tool for the Assessment of Childhood Apraxia of Speech," Speech Communication, 70 (2015): 49-64, 2015.

Xu, Dongxin, et al., "Signal Processing for Young Child Speech Language Development," First Workshop on Child, Computer and Interaction, Oct. 2008.

Howlin, Patricia, Lynn Mawhood, and Michael Rutter,"Autism and Developmental Receptive Language Disorder—a Follow-up Comparison in Early Adult Life. II: Social, Behavioural, and Psychiatric Outcomes," The Journal of Child Psychology and Psychiatry and Allied Disciplines 41.5 (2000): 561-578.

Abedi, Jamal, "The No Child Left Behind Act and English Language Learners: Assessment and Accountability Issues," Educational Researcher 33.1 (2004): 4-14.

Xu Dongxin et al., "Reliability of the LENA Language Environment Analysis System in Young Children's Natural Home Environment," LENA Foundation, Boulder, CO, Feb. 2009.

Huang et al. "Advances in Unsupervised Audio Classification and Segmentation for the Broadcast News and NGSW Corpora," IEEE Transactions on Audio, Speech, and Language Processing. vol. 14, No. 3, May 2006.

Ajmera et al., "Speech/music segmentation using entropy and dynamism features in a HMM classification framework," Speech Communication, 2003, Elsevier Science B.V. 2002, 40:351-363.

Baron-Cohen et al., "Can autism be detected at 18 months? The needle, the haystack, and the CHAT," British Journal of Psychiatry, vol. 161, Dec. 1992, pp. 839-843.

Brown, "A First Language: The Early Stages," Harvard University Press, Jun. 1973.

Fell et al., "Analysis of Infant Babble by the Early Vocalization Analyzer," presented at the American Speech-Language-Hearing Convention, Nov. 17, 2000.

Fell et al., "Automatic Babble Recognition for Early Detection of Speech Related Disorders," Proceedings of The Third International ACM SIGCAPH Conference on Assistive Technologies, Apr. 15-17, 1998, Marina del Rey, CA.

Fell et al., "EVA, an Early Vocalization Analyzer—An Empirical Validity Study of Computer Categorization," ftp.cs.rpl.edu/pub/assets96/papers/ascii/Fell.txt, Jan. 2001.

Fell et al., "Using Early Vocalization Analysis for Visual Feedback," Jan. 2001.

Fell et al., "Vocalization Age as a Clinical Tool," presented at the 7th International Conference on Spoken Language Processing, Sep. 16-20, 2002, Denver, CO.

Fredouille et al., "Application of Automatic Speaker Recognition techniques to pathological voice assessment (dysphonia)," Author Manuscript, Consultez L'Archive Half-Vous, 2007.

(56) References Cited

OTHER PUBLICATIONS

Harriet Fell's Home Page, www.ccs.neu.edu/home/fell, Jan. 2001.
Huang et al., "A Mandarin Speech Dictation System Based on Neural Network and Language Processing Model," IEEE Transactions on Consumer Electronics, Aug. 1994, 40(3).
International Search Report and Written Opinion for PCT Application No. PCT/US05/33155 dated Mar. 15, 2006, 11 pages.
International Search Report and Written Opinion for PCT Application No. PCT/US10/21852 dated Mar. 26, 2010, 6 pages.
Joel MacAuslan, PhD, biography, Jan. 2001.
Loveland et al., "Joint attention and language in autism and developmental language delay," Springer Netherlands, vol. 16, No. 3, Sep. 1986, pp. 335-349.
Magrin-Chagnolleau et al., "Detection of a Target Speakers in Audio Databases," 1999 IEEE International Conference on Acoustics, Speech, and Signal Processing, Mar. 15-19, 1999, Phoenix, AZ; 821-824.
Mahdhaoui et al., "Automatic Motherese Detection for Face-to-Face Interaction Analysis," Multimodal Signals, LNAI 5398, Springer-Verlag Berlin Heidelberg: 2009, 2489-255.
Mahdhaoui et al., "Motherese Detection Based on Segmental and Supra-Segmental Features," IEEE, 2008.
Miller et al., "The Relation Between Age And Mean Length Of Utterance In Morphemes," Journal of Speech and Hearing Research, vol. 24, Jun. 1981, pp. 154-161.
Morris, Suzanne Evans, "Pre-Speech Assessment Scale: A Rating Scale for the Measurement of Pre-Speech Behaviors from Birth through Two Years," J.A. Preston Corporation, 1982 edition, 1982.
Mundy et al., "Nonverbal communication, affective sharing, and intersubjectivity" Infant Behavior & Development, Elsevier, New York, New York, vol. 15, No. 3, 1992, pp. 377-381.
Munson, B., "A method for studying variability in fricatives using dynamic measures of spectral mean," Journal of the Acoustical Society of America, vol. 110, Issue 2, Aug. 2001.
MVDR Based Feature Extraction for Robust Speech Recognition, Tech TIPS Technology Case, University of California, San Diego, Invent.ucsd.edu/technology/cases/2001/sd2001-138.html, 2001.
Nittrouer et al., "Developmental weighting shifts for noise components of fricative-vowel syllables," Journal of the Acoustical Society of America, vol. 102, Issue 1, Jul. 1997.
Northeastern University College of Computer and Information Science—Faculty Memberes, www.ccs.neu.edu/groups/faculty/fell.html, Jan. 2001.
Paul et al., "Perception And Production Of Prosody By Speakers With Autism Spectrum Disorders," Springer Netherlands, vol. 35, No. 2, Apr. 2005, pp. 205-220.
Petitto et al., "Babbling in the manual mode: evidence for the ontogeny of language," American Association for the Advance of Science, vol. 251, Issue n5000, Mar. 22, 1991.
Pronovost et al., "A longitudinal study of the speech behavior and language comprehension of fourteen children diagnosed atypical or autistic," Exceptional Children, vol. 33, No. 1, pp. 19-26, 2001.
Samuel, "Instructional Resources for Pronunciation Practice," www.utoronto.ca/writing/pronunciation.html, 2001.
Scheffler et al., "Screening for communication and cognitive disorders in infants and toddlers," Pediatric Nursing, vol. 33, Issue 6, Nov. 2007.
Sheinkopf et al., "Vocal Atypicalities of Preverbal Autistic Children," Journal of Autism and Developmental Disorders, vol. 30, No. 4, Aug. 2000, pp. 345-354.
Slaney et al., "BabyEars: A recognition system for affective vocalizations," Speech Communications, 2003, Elsevier Science B.V. 2002, 29:367-384.
The Guide to Computing Literature, portal.acm.org/results.cfm?query+author, accessed Jul. 18, 2008. Jan. 1, 2001.
Yapanel et al., "A New Perceptually Motivated MVDR-Based Acoustic Front-End (PMVDR) for Robust Automatic Speech Recognition," The Center for Spoken Language Research, University of Colorado at Boulder, Jun. 21, 2004.
Sugiyama et al., "Speech Segmentation and Clustering Based on Speaker Features," Proc. Int. Conf. Acoustics, Speech and Signal Processing, Apr. 1993, vol. 2, pp. 395-398.
Murthy et al., "Automatic segmentation and labeling of continuous speech without bootstrapping," Proc, of EUSIPCO, 2004.
Morris, Suzanne E., "Pre-Speech Assessment Scale: A Rating Scale for Measurement of Pre-Speech Behaviors from Birth through Two Years," 1982.
Betty Hart & Todd R. Risley, "Meaningful differences in the Everyday Experience of Young American Children," (pp. vii, 21-49, 58-59, 64-67, 72-75, 132-133, 234-235, 238-241), 1995, Paul H. Brookes Publishing Co, Baltimore, MD.
St James-Roberts, Ian, "What is Distinct About Infants' 'Colic' Cries?," Archives of Disease in Childhood 1999, vol. 80, pp. 56-62, Jan. 1, 1999.
Barr, et al., "The Crying of Infants With Colic: A Controlled Empirical Description," Pediatrics, vol. 90, No. 1, Jul. 1992.
Wolke, et al., "Systematic Review and Meta-Analysis: Fussing and Crying Durations and Prevalence of Colic in Infants," The Journal of Pediatrics, vol. 185, pp. 55-61.e4, Jun. 2017.
International Search Report and Written Opinion for International Application No. PCT/US2018/064523 dated Mar. 27, 2019.
Lavner, et al., "Baby Cry Detection in Domestic Environment Using Deep Learning," 2016 IEEE International Conference on the Science of Electrical Engineering, Nov. 16, 2016.
Abou-Abbas, et al., "A Fully Automated Approach for Baby Cry Signal Segmentation and Boundary Detection of Expiratory and Inspiratory Episodes," The Journal of Acoustical Society of America, vol. 142, Issue 3, pp. 1318-1331, Sep. 11, 2017.
Tsao et al., "Speech Perception in Infancy Predicts Language Development in the Second Year of Life: A Longitudinal Study," Child Development, 75.4 (2004): 1067-1084, 2004.

* cited by examiner

FRONT VIEW

SIDE VIEW

SYSTEMS AND METHODS FOR AUTOMATIC DETERMINATION OF INFANT CRY AND DISCRIMINATION OF CRY FROM FUSSINESS

CROSS-REFERENCE TO RELATED APPLICATIONS

This application is a continuation of U.S. patent application Ser. No. 16/213,468, filed Dec. 7, 2018, which claims the benefit of U.S. Provisional Application No. 62/595,853, filed Dec. 7, 2017. U.S. patent application Ser. No. 16/213,468 and U.S. Provisional Application No. 62/595,853 are incorporated herein by reference in their entirety.

TECHNICAL FIELD

This disclosure relates generally to processing of child digital audio data, and relates more particularly to systems and methods for automatic determination of infant cry and discrimination of cry from fussiness.

BACKGROUND

Collection of digitized audio data (e.g., audio datasets from recordings) can be made in a non-invasive fashion in the natural sound environment of a child. These audio datasets can be processed to quantify different types of vocalizations of the child, and to assess the child's language development. These audio datasets also capture instances of cry and/or fussiness from the child. In conventional approaches, assessment of cry or colic in a child has generally involved an imprecise and subjective assessment by parents and/or caregivers.

BRIEF DESCRIPTION OF THE DRAWINGS

To facilitate further description of the embodiments, the following drawings are provided in which.

Figure 1:
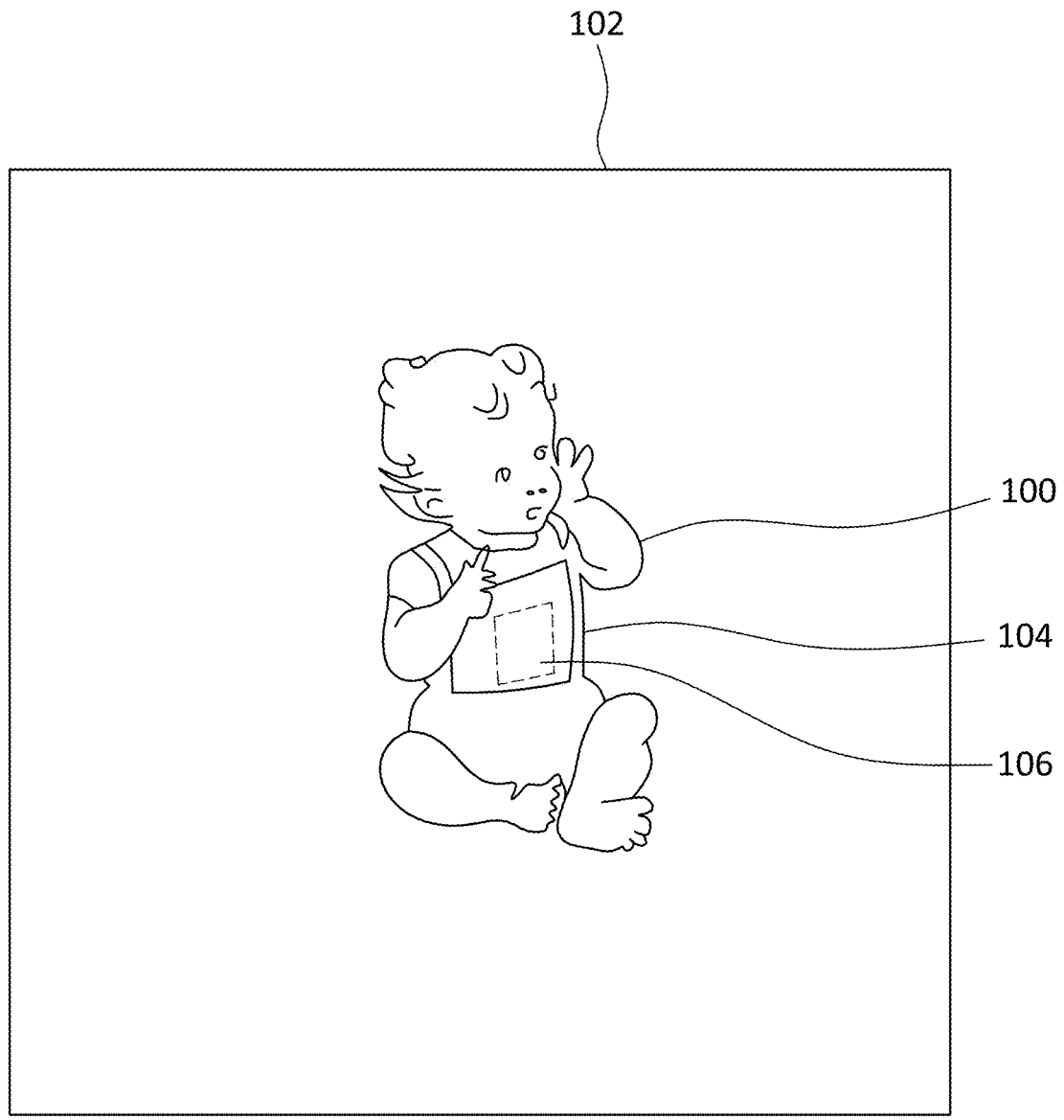
FIG. 1 illustrates a key child in a sound environment wearing an article of clothing that includes a pocket, according to one embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments include a system including one or more processors and one or more non-transitory computer-readable media storing computing instructions configured to run on the one or more processors and perform various acts. The acts can include receiving one or more datasets of audio data of a key child captured in a natural sound environment of the key child. The acts also can include segmenting each of the one or more datasets of audio data to create audio segments. The audio segments can include cry-related segments and non-cry segments. The acts additionally can include determining periods of the cry-related segments that satisfy one or more threshold non-sparsity criteria. The acts further can include performing a classification on the periods to classify each of the periods as either a cry period or a fussiness period.

Various embodiments include a method being implemented via execution of computing instructions configured to run on one or more processors and stored on one or more non-transitory computer-readable media. The method can include receiving one or more datasets of audio data of a key child captured in a natural sound environment of the key child. The method also can include segmenting each of the one or more datasets of audio data to create audio segments. The audio segments can include cry-related segments and non-cry segments. The method additionally can include determining periods of the cry-related segments that satisfy one or more threshold non-sparsity criteria. The method further can include performing a classification on the periods to classify each of the periods as either a cry period or a fussiness period.

Infantile colic (or "colic") generally involves significant amounts of uncontrolled and/or inconsolable crying in an infant. In some definitions, colic is defined as episodes of crying for more than three hours a day, for more than three days a week, for more than three weeks for an otherwise healthy infant who is not ill, hungry, uncomfortable, in obvious pain, etc. The infant is typically less than four months of age. The crying involved in colic is generally high-intensity crying, as opposed to fussiness, which involves lower-intensity crying. For example, in fussiness, the infant typically has regular breathing with normal air intake between cries, but in colicky crying, the infant's breathing often involves agitated breathing with sudden air intake between cries. As another example, high-intensity cries are often louder and higher pitched than cries in fussiness.

In conventional approaches, determining the amount of crying from an infant, and/or determining whether the infant has colic, is typically done through parental reporting. Parental reporting, however, has several disadvantages. For example, much of parental reporting is based on memory, which is unreliable. In many cases, parents are instructed to use a baby diary log to record when the infant cries or is inconsolable, but most parents have a hard time regularly recording all episodes of crying with accuracy. One reason is that a crying child typically generates a great deal of stress for parents. Further, the parents often have difficulty distinguishing between intense crying and non-intense crying. Even when parental recording is performed regularly, there are subjective differences between the reporting of different parents.

In order to determine if an intervention (e.g., medicine, a change in diet, etc.) is effective, it is advantageous to be able to quantify the amount of cry, as opposed to fussiness, from the infant. By quantifying the amount of cry in an objective way, the subjective differences between parents in parental reporting can be overcome, beneficially providing an objective consistency in quantifying the level of crying and/or colic.

In a number of embodiments, an audio capture device can be worn by a key child to capture datasets of audio data of the natural sound environment of the child in a non-invasive fashion. These datasets of audio data can be processed into segments to quantify aspects of the datasets, such as to monitor and/or analyze the natural sound environment, vocalizations, and the development of a key child. A key child as used herein may be a child, an adult, such as an adult with developmental disabilities, or any individual who produces sounds that are of interest. A natural sound environment of the key child can be monitored without placing artificial limitations on the activities of the key child or requiring a third-party observer. The natural sound environment can be analyzed to identify the types of sounds produced by the key child.

A natural sound environment can include an area surrounding a key child during his or her normal daily activities and contain sources of sounds that may include the key child, other children, an adult, an electronic device, and background noise. A clinical or research environment, by contrast, can include a controlled environment or location that contains pre-selected or natural sources of sounds.

In some embodiments, the key child may wear an article of clothing that includes an audio capture device located in a pocket attached to or integrated with the article of clothing. The audio capture device may be configured to record and store, and/or otherwise process, audio data associated with the sound environment of the key child for a predetermined amount of time. The datasets of audio data can include background or environmental noise, silence, the spoken words or other sounds of the key child, words spoken by others, sounds from electronic devices such as televisions and radios, or any sound or words from any source. The location of the audio capture device preferably allows it to capture the vocal productions of the key child without interfering in the normal activities of the key child. During or after the pre-set amount of time, the datasets of audio data captured by the audio capture device can be processed and analyzed. For example, the datasets of audio data may be analyzed to identify segments and assign a segment ID or a source for each audio segment using a Minimum Duration Gaussian Mixture Model (MD-GMM). In some embodiments, the processing can be performed in a processing device outside the audio data. In other embodiments, the audio data captured can be processed in the audio capture device. For example, in various embodiments, the audio data can be processed as it is received.

Sources for each audio segment can include the key child, an adult, another child, an electronic device, or any person or object capable of producing sounds. Sources may also include general sources that are not associated with a particular person or device. Examples of such general sources include background or environmental noise, silence, and overlapping sounds. In some embodiments, sources are identified by analyzing each audio segment using models of different types of sources. The models may include audio characteristics commonly associated with each source. Audio segments for which the key child or an adult is identified as the source may be further analyzed, such as by determining certain characteristics associated with the key child and/or adult, to provide metrics associated with the sounds produced by the key child.

In some embodiments, an audio capture device may be used to capture, process, record, and/or store audio associated with the sound environment of the key child. The audio capture device may be any type of device adapted to process audio data and/or capture and store audio data. The audio capture device can store audio over a long term (e.g., a day) or a short term (e.g., brief storage, such as a few seconds, in a memory buffer). The audio capture device can be located in or around a sound environment of a child. In some embodiments, the audio capture device can include one or more microphones connected to a storage device and can be located in one or more rooms that the key child often occupies. In other embodiments, the audio capture device is located in an article of clothing worn by the child.

Turning to the drawings, FIG. 1 illustrates a key child, such as child 100, in a sound environment 102 wearing an article of clothing 104 that includes a pocket 106. The pocket 106 may include an audio capture device (not shown) that is adapted to capture audio from sound environment 102. Sound environment 102 can be an area surrounding child 100 that includes sources for audio (not shown), including one or more adults, other children, and/or electronic devices such as a television, a radio, a toy, background noise, or any other source that produces sounds. Examples of sound environment 102 include a natural sound environment or a clinical or research environment. Article of clothing 104 can be the normal clothing of child 100, a vest over the normal clothing of child 100, or any article of clothing commonly worn by child 100.

In some embodiments, the audio capture device is placed at or near the center of the chest of the key child. However, other placements are possible. The audio capture device in pocket 106 can be any device capable of capturing audio associated with the sound environment of child 100.

One example of an audio capture device is a digital audio recorder of the LENA system of the LENA Foundation in Boulder, Colo. The audio capture device can be relatively small and lightweight and can be placed in pocket 106. Pocket 106 can hold the audio capture device in place in an unobtrusive manner so that the audio capture device does not distract child 100, other children, and adults that interact with child 100.

Figure 2A:
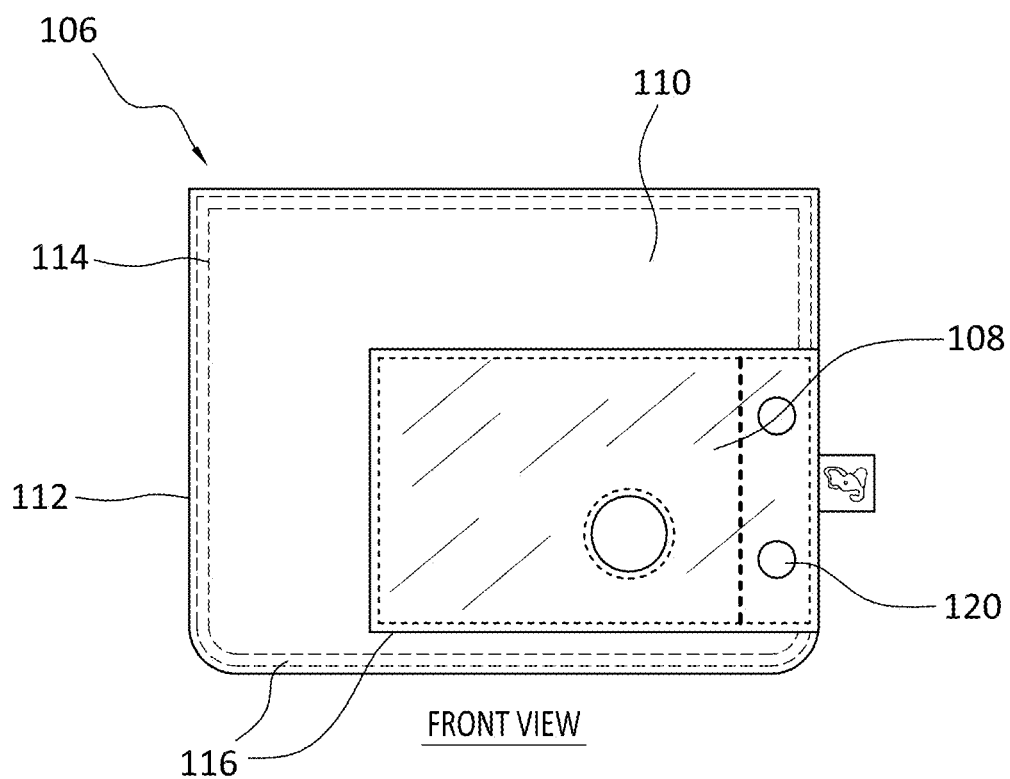
FIG. 2A illustrates a front view of the pocket of FIG. 1 including an audio capture device, according to an embodiment.
Figure 2B:
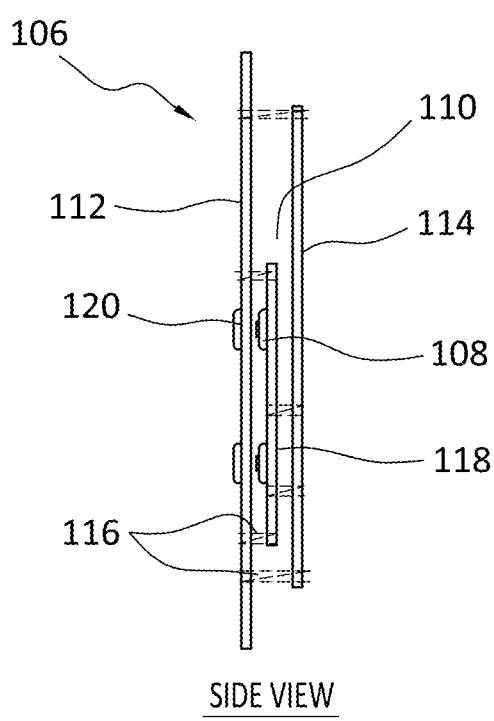
FIG. 2B illustrates a side view of the pocket of FIG. 1 and the audio capture device of FIG. 2A.

Turning ahead in the drawings, FIG. 2A illustrates a front view of pocket 106 including an audio capture device 108, and FIG. 2B illustrates a side view of pocket 106 including audio capture device 108. Audio capture device 108 is merely exemplary, and embodiments of the system are not limited to the embodiments presented herein. The audio capture device can be employed in many different embodiments or examples not specifically depicted or described herein. Pocket 106 can be designed to keep audio capture device 108 in place and to minimize acoustic interference. Pocket 106 can include an inner area 110 formed by a main body 112 and an overlay 114 connected to main body 112 via stitches 116 or another suitable connecting mechanism. Main body 112 can be part of article of clothing 104, or alternatively attached to article of clothing 104 (FIG. 1) using stitches or by another suitable connecting mechanism. A stretch layer 118 can be located in inner area 110 and attached to main body 112 and overlay 114 via stitches 116. Audio capture device 108 can be located between main body 112 and stretch layer 118. Stretch layer 118 can be made of a fabric adapted to stretch but provide a force against audio capture device 108 to retain audio capture device 108 in its position. For example, stretch layer 118 can be made from a blend of nylon and spandex, such as eighty-five percent (85%) nylon and fifteen percent (15%) spandex, which can help to keep audio capture device 108 in place. Overlay 114 can cover stretch layer 118 and, in some embodiments, can include at least one opening in which the microphone of audio capture device 108 is located. The opening can be covered with a material that provides certain desired acoustic properties. In one embodiment, the material is one hundred percent (100%) cotton.

Pocket 106 also can include snap connectors 120 by which overlay 114 is opened and closed to install or remove the audio capture device 108. In some embodiments, at least one of stitches 116 can be replaced with a zipper to provide access to the audio capture device 108 in addition to or as an alternative to using snap connectors 120.

When audio capture device 108 includes multiple microphones, pocket 106 can include multiple openings that correspond to the placement of the microphones on audio capture device 108. The particular dimensions of pocket 106 can change as the design of audio capture device 108 changes or as the number or type of microphones change. In some embodiments, pocket 106 can position the microphone relative to the mouth of the key child to provide certain acoustical properties and secure the microphone (and optionally audio capture device 108) in a manner that does not result in friction noises captured by the microphone. Audio capture device 108 can be turned on and thereafter capture audio, including sounds produced by the key child, other children, and adults, as well as other types of sounds that the child encounters, including television, toys, environmental noises, etc. The audio data can be stored in audio capture device 108. In some embodiments, audio capture device 108 can be periodically removed from pocket 106 and the stored audio can be analyzed, or the audio can be transmitted wirelessly from audio capture device 108. In other embodiments, the data can be processed within audio capture device 108, such as while the data is being captured.

Figure 3:
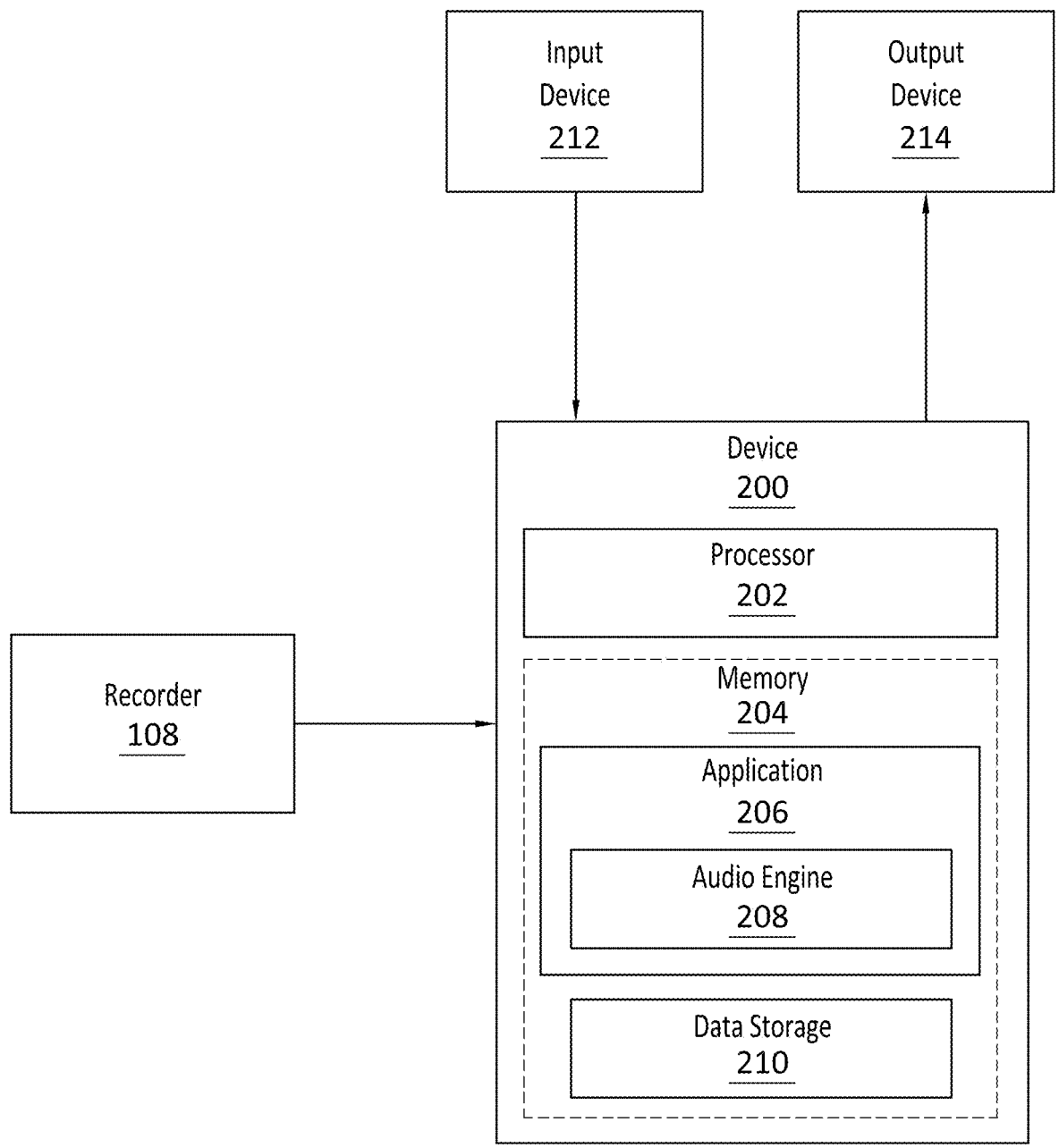
FIG. 3 illustrates an audio data processing system including the audio capture device of FIG. 2A and a device for analyzing audio data, according to an embodiment.

Turning ahead in the drawings, FIG. 3 illustrates an audio data processing system including audio capture device 108 and a device 200 for analyzing datasets of audio data. Device 200 is merely exemplary and embodiments of the system are not limited to the embodiments presented herein. The device can be employed in many different embodiments or examples not specifically depicted or described herein. In some embodiments, certain elements or modules of device 200 can perform various procedures, processes, and/or activities. In other embodiments, the procedures, processes, and/or activities can be performed by other suitable elements or modules of device 200.

In many embodiments, device 200 can include a processor 202 and a computer-readable medium, such as memory 204. Audio capture device 108 may be connected to device 200 via wireline or wirelessly. In some embodiments, audio capture device 108 can be connected to device 200 via a USB cable. Device 200 can be any type of processor-based device, examples of which include a computer and a server. For example, in some embodiments, device 200 can be a general-purpose mobile device, such as a smartphone. In other embodiments, device 200 can be specific hardware configured for implementing at least a portion of the systems and/or methods described herein. Memory 204 can be configured to store computer-executable instruction code and data. The computer-executable instruction code can include an application 206, such as a data analysis application that can be used to view, generate, and output data analysis. Application 206 can include an audio engine 208 that, as described in more detail below, can be configured to perform methods according to various embodiments to analyze audio data and generate metrics associated therewith. In some embodiments, audio engine 208 can be a separate application that is executable separate from, and optionally concurrent with, application 206. Memory 204 also can include a data storage 210 that is configured to store data generated by the application 206 or audio engine 208, or input by a user. In some embodiments, data storage 210 can be separate from device 200 but connected to device 200 via wireline or wireless connection.

In a number of embodiments, device 200 can be in communication with an input device 212 and an output device 214. Input device 212 can be configured to receive user input and communicate the user input to device 200. Examples of input device 212 can include a keyboard, mouse, scanner, and network connection. User inputs can include commands that cause processor 202 to execute various functions associated with application 206 or audio engine 208. In many embodiments, output device 214 can be configured to provide data or visual output from application 206 or audio engine 208. In some embodiments, output device 214 can display a graphical user interface (GUI) that includes one or more selectable buttons that are associated with various functions provided by application 206 or audio engine 208. Examples of output device 214 can include a monitor, network connection, and printer. Input device 212 can be used to setup or otherwise configure audio engine 208. For example, the age of the key child and other information associated with the key child's sound environment may be provided to audio engine 208 and stored in local storage 210 during a setup or configuration via input device 212.

In many embodiments, the audio file stored on audio capture device 108 can be uploaded to device 200 and stored in local storage 210. In some embodiments, the audio data can be uploaded in a proprietary format which can prevent the playback of the speech from device 200 or access to content of the speech, thereby promoting identity protection of the speakers. In other embodiments, the audio data can be uploaded without being encoded to allow for storage in local storage 210 and playback of the file or portions of the file.

In some embodiments, device 200 can be a web server, and input device 212 and output device 214 can be combined to form a computer system that sends data to and receives data from device 200 via a network connection. Input device 212 and output device 214 can be used to access application 206 and audio engine 208 remotely and cause it to perform various functions according to various embodiments. Audio capture device 108 can be connected to input device 212 and output device 214, and the audio data stored on audio capture device 108 can be uploaded to device 200 over a network such as the Internet or an intranet in which the audio data are processed and metrics are provided to output device 214. In some embodiments, the audio data received remotely from input device 212 and output device 214 can be stored in local storage 210 and subsequently accessed for research purposes or otherwise.

To reduce the amount of memory needed on audio capture device 108, the audio data can be compressed. In some embodiments, a digital visual interface (DVI), such as a DVI-4 adaptive differential pulse-code modulation (ADPCM) compression scheme can be used. If a compression scheme is used, then the file can be decompressed after it is uploaded to device 200 to a normal linear pulse code modulation (PCM) audio format or other suitable audio format.

Figure 4:
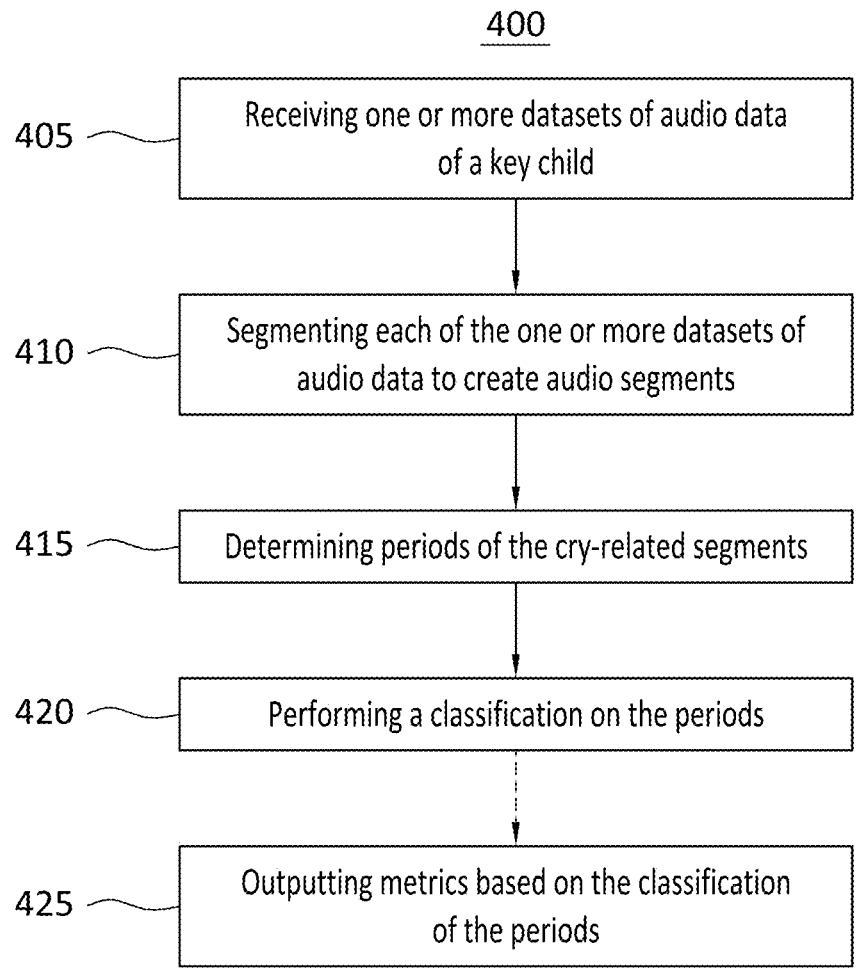
FIG. 4 is a flow chart for a method, according to an embodiment.

Turning ahead in the drawings, FIG. 4 illustrates a flow chart for a method 400, according to an embodiment. In many embodiments, method 400 can be a method of determining cry segments and discrimination of cry from fussiness. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In some embodiments, method 400 can be performed by device 200 (FIG. 3).

Referring to FIG. 4, method 400 can include a block 405 of receiving one or more datasets of audio data of a key child captured in a natural sound environment of the key child. In many embodiments, the datasets of audio data can be similar or identical to the audio data captured by audio capture device 108 (FIGS. 2A, 2B, 3). In some embodiments, the datasets of audio data can be digitized audio data, such as digital audio recordings. In many embodiments, the datasets of audio data can be received by being uploaded into device 200 (FIG. 3), as described above. For example, the datasets of audio data can be uploaded to a cloud-based server. In other embodiments, the datasets of audio data can be captured and processed on audio capture device 108 (FIGS. 2A, 2B, 3) without uploading to another device. In a number of embodiments, the datasets of audio data of the key child can be datasets of audio data in which the key child is less than 4 months old. For example, the datasets of audio data can be used to quantify cry in infantile colic. In other embodiments, the datasets of audio data can be datasets of audio data in which the key child is another suitable age. For example, in certain other embodiments, the datasets of audio data can be used to quantify cry for other purposes, such as part of analyzing a child for autism spectrum disorder (ASD), and the key child can be, for example, between 1 to 3 years old. The datasets of audio data can capture the natural sound environment of the key child over a suitable amount of time, such as 8 hours, 12 hours, 16 hours, 24 hours, or another suitable duration.

In a number of embodiments, method 400 also can include a block 410 of segmenting each of the one or more datasets of audio data to create a plurality of audio segments. In many embodiments, the plurality of audio segments can include a plurality of cry-related segments and a plurality of non-cry segments. In many embodiments, the segmenting of the datasets of audio data can create segments having a duration of approximately 300 milliseconds to 1.0 second in length. In some embodiments, the duration of the segments can be variable across the segments. In other embodiments, the duration of the segments can be fixed across all of the segments. As an example, the segmenting of block 410 can be performed by device 200 (FIG. 3).

In many embodiments, the segmenting process can involve using machine-learning algorithms to automatically parse the datasets of audio data into labeled time segments. For example, each of the labeled segments can fall into one of eight categories that indicates the dominant source of sound in the segment, namely: (1) male adult, (2) female adult, (3) key child, (4) other child, (5) overlap, (6) background or environmental noise, (7) TV/electronic, and (8) silence. The key child is the child wearing the audio capture device (e.g., 108 (FIGS. 2A, 2B, 3)). Although there can be multiple co-occurring sounds within a time segment, such as a mother talking while the key child is crying and a TV is on in the background, in some embodiments, the segment processing can label the segment based on the sound that is most dominant or has the highest likelihood of the eight categories. For example, the mother may be attempting to soothe the key child with a song, and when the baby has an intake of breath, the mother's voice can be dominant over the cries of the key child. For the sounds labeled as key child, the segmenting process can involve assigning subcategories, namely: (1) VOC for vocalization sounds, (2) VEG for vegetative sounds, and (3) CRY for cry-related sounds.

In some embodiments, to perform the segmenting process, an audio engine (e.g., audio engine 208 (FIG. 3)) can divide the dataset of audio data into one or more audio segments and can identify a segment ID or source for each of the audio segments from the dataset of audio data received from the audio capture device 108 (FIGS. 2A, 2B, 3). This process is referred to herein as "segmentation" and "segment ID." In some embodiments, an audio segment can be a portion of the dataset of audio data (e.g., a portion of an audio recording) having a certain duration and including acoustic features associated with the natural sound environment of the key child during the duration. The dataset of audio data can include a number of audio segments, each associated with a segment ID or source. Sources can include an individual or a device that produces the sounds within the audio segment. For example, an audio segment may include the sounds produced by the key child, who is identified as the source for that audio segment. Sources also can include other children, adults, electronic devices, background or environmental noise, overlapped sounds, and silence. Electronic devices can include televisions, radios, telephones, toys, and any device that provides recorded or simulated sounds such as human speech.

Sources associated with each of the audio segments can be identified to assist in further classifying and analyzing the dataset of audio data. Some metrics provided by some embodiments include data regarding certain sources and disregard data from other sources. For example, audio segments associated with live speech directed to the key child can be distinguished from audio segments associated with electronic devices.

To perform segmentation to generate the audio segments and identify the sources for each segment, a number of models may be used that correspond to the key child, other children, male adult, female adult, background noise, TV sound, silence, and overlap. Alternative embodiments may use more, fewer, or different models to perform segmentation and identify a corresponding segment ID. One such technique performs segmentation and segment ID separately. Another technique performs segmentation and identifies a segment ID for each segment concurrently.

Traditionally, a Hidden Markov Model (HMM) with minimum duration constraint has been used to perform segmentation and identify segment IDs concurrently. A number of HMM models may be provided, each corresponding to one source. The result of the model can be a sequence of sources with a likelihood score associated with each source. The optimal sequence can be searched using a Viterbi algorithm or dynamic programming and the "best" source can be identified for each segment based on the score. However, this approach can be complex for some segments in part because it uses transition probabilities from one segment to another, that is, the transition between each segment. Transition probabilities are related to duration modeling of each source. HMM duration models can have discrete geometric distribution or continuous exponential distribution, which may not be appropriate for the sound sources of concern. Most audio data can include segments having a high degree of variation in their duration. Although the HMM model can be used in some embodiments, alternative techniques can be used to perform segmentation and segment ID.

An alternative technique used in some embodiments to perform segmentation and segment ID is a Minimum Duration Gaussian Mixture Model (MD-GMM). Each model of the MD-GMM can include criteria or characteristics associated with sounds from different sources. Examples of models of the MD-GMM include a key child model that includes characteristics of sounds from a key child, an adult model that includes characteristics of sounds from an adult, an electronic device model that includes characteristics of sounds from an electronic device, a noise model that includes characteristics of sounds attributable to background or environmental noise, another child model that includes characteristics of sounds from a child other than the key child, a parentese model that includes complexity level speech criteria of adult sounds, an age-dependent key child model that includes characteristics of sounds of a key child of different ages, and a loudness/clearness detection model that includes characteristics of sounds directed to a key child. Some models can include additional models. For example, the adult model can include an adult male model that includes characteristics of sounds of an adult male and an adult female model that includes characteristics of sounds of an adult female. The models can be used to determine the source of sound in each segment by comparing the sound in each segment to criteria of each model and determining if a match of a pre-set accuracy exists for one or more of the models.

In some embodiments, the MD-GMM technique begins when the dataset of audio data (e.g., an audio recording) is converted to a sequence of frames or segments. Segments having a duration of 2*D, where D is a minimum duration constraint, are identified using a maximum log-likelihood algorithm for each type of source. The maximum score for each segment is identified. The source associated with the maximum score is correlated to the segment for each identified segment.

In many embodiments, audio engine 208 (FIG. 3) can process datasets of audio data using the maximum likelihood MD-GMM to perform segmentation and segment ID. Audio engine 208 (FIG. 3) can search all possible segment sequences under a minimum duration constraint to identify the segment sequence with maximum likelihood. One possible advantage of MD-GMM is that any segment longer than twice the minimum duration (2*D) could be equivalently broken down into several segments with a duration between the minimum duration (D) and two times the minimum duration (2*D), such that the maximum likelihood search process ignores all segments longer than 2*D. This can reduce the search space and processing time. One implementation of using maximum likelihood MD-GMM is explained below. Other implementations are also possible, such as:

1. Acoustic Feature Extraction—the audio stream is converted to a stream of feature vectors $\{X_1, X_2 \ldots X_T | X_i \in R^n\}$ using a feature extraction algorithm, such as the MFCC (mel-frequency cepstrum coefficients).
2. Log likelihood calculation for a segment $\{X_1, X_2 \ldots X_S\}$:

$$Lcs = \sum_{i=1}^{S} \log(f_c(X_i)),$$

where $f_c(X_i)$ is the likelihood of frame $X_i$ being in class c.

The following describes one procedure of maximum likelihood MD-GMM search:
1. Initialize searching variables: $S(c,0,0)=0$, $c=1, \ldots, C$, where c is the index for all segment classes. Generally, the searching variable $S(c,b,n)$ represents the maximum log-likelihood for the segment sequence up to the frame b−1 plus the log-likelihood of the segment from frame b to frame n being in class c.
2. Score frames for $n=1, \ldots, T$, i.e. all feature frames:

$$S(c,b,n)=S(c,b,n-1)+\log(f_c(X_n)), \forall b,c,n-b<2*D_c,$$

i.e., the current score at frame n could be derived from the previous score at frame n−1. The searching variable for segments less than twice the minimum duration is retained.
3. Retain a record of the optimal result at frame n (similarly, segments under twice the minimum duration will be considered):

$$S^*(n) = \max_{c,b,2^*Dc>9n-b)>Dc} S(c,b,n)$$

$$B^*(n) = \arg\max_{b,(c,b,2^*Dc>(n-b)>Dc} S(c,b,n)$$

$$C^*(n) = \arg\max_{c,(c,b,2^*Dc>(n-b)>Dc} S(c,b,n)$$

4. Initialize new searching variables for segments starting at frame n:

$$S(c,n,n)=S^*(n), \forall c$$

5. Iterate step 4 to step 6 until the last frame T.
6. Trace back to get the maximum likelihood segment sequence.

The very last segment of the maximum likelihood segment sequence is $(C^*(T),B^*(T),T)$, that is, the segment starting from frame $B^*(T)$ and ending with frame T with class id of $C^*(T)$. The remaining segments can be obtained in the best sequence by using the following back-tracing procedure:
6.1. Initialize back-tracing:

$$t=T, m=1$$

$$S(m)=(C^*(t),B^*(t),t)$$

6.2. Iterate back-tracing until t=0

$C\_\text{current}=C^*(t)$ $t=B^*(t)$

If $C^*(t)=C$ current, then do nothing;
Otherwise, $m=m+1$, $S(m)=(C^*(t),B^*(t),t)$ Additional processing can be performed to further refine identification of segments associated with the key child or an adult as sources. As stated above, the language environment can include a variety of sources that may be identified initially as the key child or an adult when the source is actually a different person or device. For example, sounds from a child other than the key child may be initially identified as sounds from the key child. Sounds from an electronic device may be confused with live speech from an adult. Furthermore, some adult sounds may be detected that are directed to another person other than the key child. Certain embodiments may implement methods for further processing and refining the segmentation and segment ID to decrease or eliminate inaccurate source identifications and to identify adult speech directed to the key child.

Further processing can occur concurrently with, or subsequent to, the initial MD-GMM model described above. One embodiment is an adaptation method for further processing the dataset of audio data by modifying models associated with the MD-GMM subsequent to an initial MD-GMM. First, audio engine 208 (FIG. 3) can process the dataset of audio data using a first MD-GMM. For example, the dataset of audio data is processed in accordance with the MD-GMM described above to perform an initial segmentation and segment ID.

Second, audio engine 208 (FIG. 3) can modify at least one model of the MD-GMM. Audio engine 208 (FIG. 3) can automatically select one or more models of the MD-GMM to modify based on pre-set steps. In some embodiments, if audio engine 208 (FIG. 3) detects certain types of segments that involve further scrutiny, it can select the model of the MD-GMM that is most related to the types of segments detected to modify (or for modification). Any model associated with the MD-GMM can be modified. Examples of models that can be modified include the key child model with an age-dependent key child model, an electronic device model, a loudness/clearness model that may further modify the key child model and/or the adult model, and a parentese model that may further modify the key child model and/or the adult model.

Third, audio engine 208 (FIG. 3) can process the dataset of audio data again using the modified models of the MD-GMM. The second process can result in a different segmentation and/or segment ID based on the modified models, providing a more accurate identification of the source associated with each segment.

Fourth, audio engine 208 (FIG. 3) can determine whether to perform additional model modification. In some embodiments, audio engine 208 (FIG. 3) analyzes the new segmentation and/or segment ID to determine if any segments or groups of segments would benefit from additional scrutiny. In some embodiments, audio engine 208 (FIG. 3) can access data associated with the language environment in data storage 210 (FIG. 3) and can use it to determine if additional model modification would be beneficial, such as a modification of the key child model based on the current age of the child. If additional model modification would be beneficial, the process can return to step 2 of modifying the model of the MD-GMM described above for additional MD-GMM model modification. If no additional model modification would be beneficial, the process can proceed to analyzing the segment sound. Certain embodiments of modifying exemplary models in accordance with various embodiments are described below. Other models than those described below may be modified in certain embodiments.

In some embodiments, audio engine 208 (FIG. 3) can implement an age-dependent key child model concurrently with, or subsequent to, the initial MD-GMM to modify the key child model of the MD-GMM to more accurately distinguish segments in which other children are the source from segments in which the key child is the source. For example, the MD-GMM can be modified to implement an age-dependent key child model during the initial or a subsequent segmentation and segment ID.

The key child model can be age dependent because the audio characteristics of the vocalizations, including utterances and other sounds, of a key child can change dramatically over the time that audio capture device 108 (FIGS. 2A, 2B, 3) can be used. Although the use of two separate models within the MD-GMM, one for the key child and one for other children, can identify the vocalizations of the key child, the use of an age-dependent key child model further helps to reduce the confusion between vocalizations of the key child and vocalizations of the other children. In one embodiment, the age-dependent key child models are: (1) less than one-year old, (2) one-year old, (3) two-years old, and (4) three-years old. Alternative embodiments can use other age groupings and/or may use groupings of different age groups. For example, other embodiments could use monthly age groups or a combination of monthly and yearly age groups. Each of the models can include characteristics associated with sounds commonly identified with children of the age group.

In one embodiment, the age of the key child can be provided to device 200 (FIG. 3) via input device 212 (FIG. 3) during a set-up or configuration. Audio engine 208 (FIG. 3) can receive the age of the key child and can select one or more of the key child models based on the age of the key child. For example, if the key child is one year and ten months old, audio engine 208 can select key child model 2 (one-year-old model) and key child model 3 (two-years-old model) or only key child model 2 based on the age of the key child. Audio engine 208 (FIG. 3) can implement the selected key child model or models by modifying the MD-GMM models to perform the initial or a subsequent segmentation and segment ID.

In some embodiments, any segments including sounds, such as words or speech, that are generated electronically by an electronic device can be identified as such, as opposed to an inaccurate identification as live speech produced by an adult. Electronic devices can include a television, radio, telephone, audio system, toy, or any electronic device that produces recordings or simulated human speech. In some embodiments, audio engine 208 (FIG. 3) can modify an electronic device model in the MD-GMM to more accurately identify segments from an electronic device source and separate them from segments from a live adult without determining the content of the segments and without limiting the environment of the speaker (e.g., without requiring the removal of or inactivation of the electronic devices from the language environment).

In many embodiments, audio engine 208 (FIG. 3) can be adapted to modify and use the modified electronic device model concurrently with, or subsequent to, the initial MD-GMM process. In some embodiments, the electronic device model can be implemented after a first MD-GMM process is performed and used to adapt the MD-GMM for additional determinations using the MD-GMM for the same dataset of audio data. In a number of embodiments, audio engine 208 (FIG. 3) can examine segments segmented using a first MD-GMM to further identify reliable electronic segments. Reliable electronic segments can be segments that are more likely associated with a source that is an electronic device and include certain criteria. For example, audio engine 208 (FIG. 3) can determine if one or more segments include criteria commonly associated with sounds from electronic devices. In some embodiments, the criteria can include (1) a segment that is longer than a predetermined period or is louder than a predetermined threshold; or (2) a series of segments having a pre-set source pattern. An example of one predetermined period is five seconds. An example of one pre-set source pattern can include the following:

Segment 1—Electronic device source;
Segment 2—A source other than the electronic device source (e.g., adult);
Segment 3—Electronic device source;
Segment 4—A source other than the electronic device source; and
Segment 5—Electronic device source.

The reliable electronic device segments can be used to adapt the MD-GMM to include an adaptive electronic device model for further processing. For example, audio engine 208 (FIG. 3) can use a regular K-means algorithm as an initial model and tune it with an expectation-maximization (EM) algorithm. The number of Gaussians in the adaptive electronic device model can be proportional to the amount of feedback electronic device data and not exceed an upper limit. In one embodiment, the upper limit is 128. Other suitable upper limits can be used.

In several embodiments, audio engine 208 (FIG. 3) can perform the MD-GMM again by applying the adaptive electronic device model to each frame of the sequence to determine a new adaptive electronic device log-likelihood score for frames associated with a source that is an electronic device. The new score may be compared with previously stored log-likelihood scores for those frames. Audio engine 208 (FIG. 3) can select the larger log-likelihood score based on the comparison. The larger log-likelihood score can be used to determine the segment ID for those frames.

In some embodiments, the MD-GMM modification using the adaptive electronic device model can be applied using a pre-set number of consecutive equal length adaptation windows moving over all frames. The audio data can be divided into overlapping frames having a pre-set length. An example of frame length according to one embodiment is 25.6 milliseconds with a 10 millisecond shift resulting in 15.6 milliseconds of frame overlap. The adaptive electronic device model can use local data obtained using the pre-set number of adaptation windows. An adaptation window size of 30 minutes can be used in some embodiments. An example of one pre-set number of consecutive equal length adaptation windows is three. In some embodiments, adaptation window movement does not overlap. The frames within each adaptation window can be analyzed to extract a vector of features for later use in statistical analysis, modeling, and classification algorithms. The adaptive electronic device model can be repeated to further modify the MD-GMM process. For example, the process may be repeated three times.

In order to select the frames that are most useful for identifying the speaker, some embodiments use frame level near/far detection or loudness/clearness detection model. Loudness/clearness detection models can be performed using a Likelihood Ratio Test (LRT) after an initial MD-GMM process is performed. At the frame level, the LRT can be used to identify and discard frames that could confuse the identification process. For each frame, the likelihood for each model can be calculated. The difference between the most probable model likelihood and the likelihood for the silence model is calculated and the difference is compared to a predetermined threshold. Based on the comparison, the frame is either dropped or used for segment ID. For example, if the difference meets or exceeds the predetermined threshold, then the frame is used; but if the difference is less than the predetermined threshold, then the frame is dropped. In some embodiments, frames are weighted according to the LRT.

In many embodiments, audio engine 208 (FIG. 3) can use the LRT to identify segments directed to the key child. For example, audio engine 208 (FIG. 3) can determine whether adult speech is directed to the key child or to someone else by determining the loudness/clearness of the adult speech or sounds associated with the segments. Once segmentation and segment ID are performed, segment-level near/far detection can be performed using the LRT in a manner similar to that used at the frame level. For each segment, the likelihood for each model can be calculated. The difference between the most probable model likelihood and the likelihood for the silence model can be calculated and the difference can be compared to a predetermined threshold. Based on the comparison, the segment can be either dropped or processed further.

Sometimes adults use baby talk or "parentese" when directing speech to children. The segments including parentese can be inaccurately associated with a child or the key child as the source because certain characteristics of the speech may be similar to speech-related vocalizations of the key child or other children. In many embodiments, audio engine 208 (FIG. 3) can modify the key child model and/or adult model to identify segments including parentese and associate the segments with an adult source. For example, the models may be modified to allow audio engine 208 (FIG. 3) to examine the complexity of the speech included in the segments to identify parentese. Because the complexity of adult speech is typically much higher than that of speech-related child vocalizations, the source for segments including relatively complex speech can be identified as an adult. Speech can be complex if the formant structures are well formed, the articulation levels are good, and the vocalizations are of sufficient duration—consistent with speech commonly provided by adults. Speech-related vocalization from a child can include formant structures that are less clear and developed and vocalizations that are typically of a lesser duration. In addition, audio engine 208 (FIG. 3) can analyze formant frequencies to identify segments including parentese. When an adult uses parentese, the formant frequencies of the segment typically do not change. Sources for segments including such identified parentese can be determined to be an adult.

The MD-GMM models can be further modified and the audio data can be further processed for a pre-set number of iterations or until audio engine 208 (FIG. 3) determines that the segment IDs have been determined with an acceptable level of confidence. Upon completion of the segmentation and segment ID, the identified segment can be further analyzed to extract characteristics associated with the language environment of the key child.

During or after performing segmentation and segment ID, audio engine 208 (FIG. 3) can classify key child audio segments into one or more categories, as described above. In some embodiments, audio engine 208 (FIG. 3) can analyze each segment for which the key child is identified as the source and can determine a category based on the sound in each segment. The categories can include vocalizations, cries, vegetative sounds, and fixed-signal sounds. Vocalization sounds can include words, phrases, marginal syllables, including rudimentary consonant-vowel sequences, utterances, phonemes, sequence phonemes, phoneme-like sounds, protophones, lip-trilling sounds commonly called raspberries, canonical syllables, repetitive babbles, pitch variations, or any meaningful sounds which contribute to the language development of the child, indicate at least an attempt by the child to communicate verbally, or explore the capability to create sounds. Vegetative sounds can include non-vocal sounds related to respiration and digestion, such as coughing, sneezing, and burping. Fixed-signal sounds are related to voluntary reactions to the environment and include laughing, moaning, sighing, and lip smacking, and can be labeled as vegetative sounds. Cries are a type of fixed-signal sound but are detected separately. Cry segments can include any cry-related sound, such as intense cry (e.g., colicky cries), screams, wails, fussiness (e.g., non-colicky), and any other types of cry-related sounds.

Figure 5:
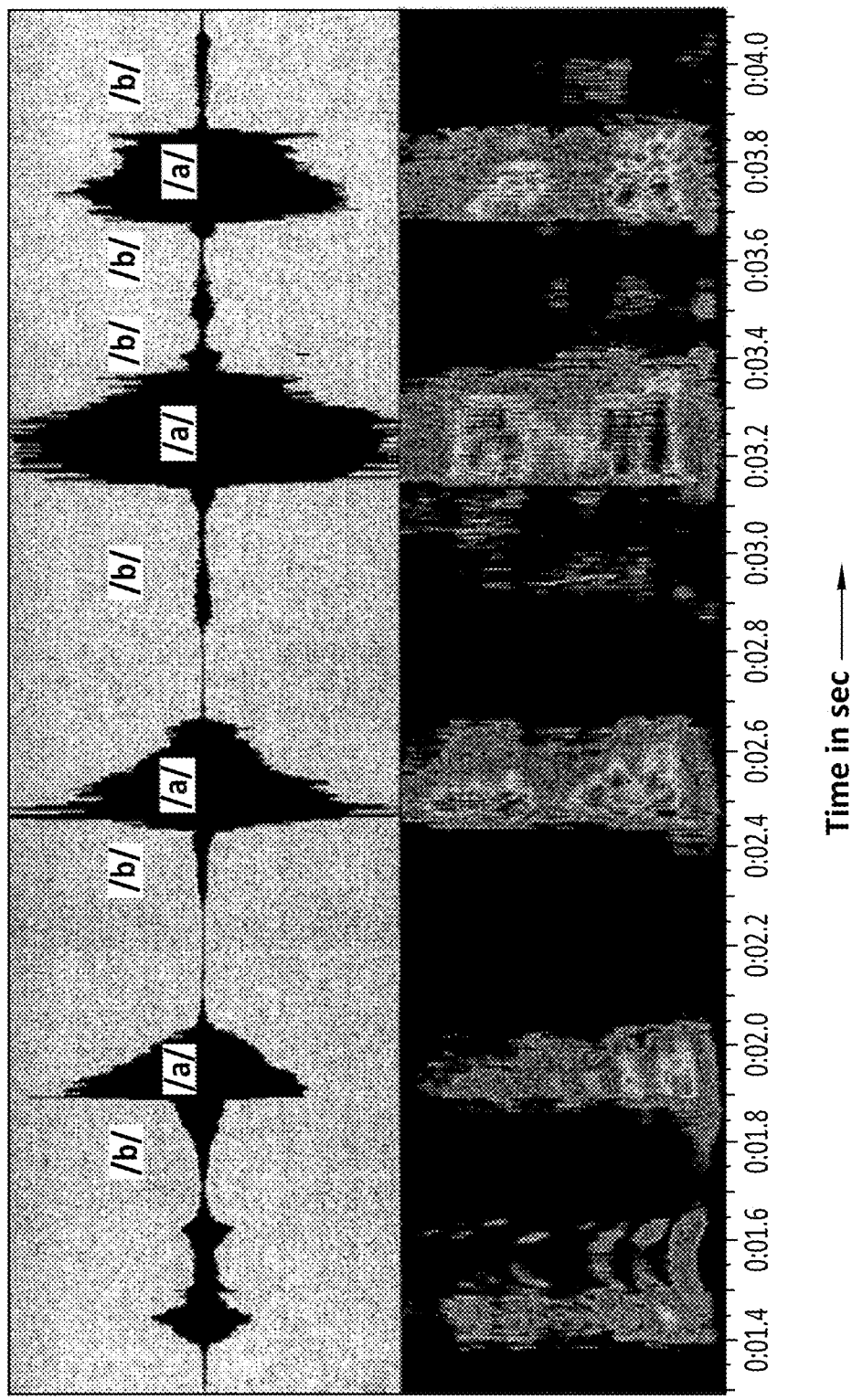
FIG. 5 illustrates energy levels of sound in a segment associated with the key child of FIG. 1.

In many embodiments, audio engine 208 (FIG. 3) may classify key child audio segments using rule-based analysis and/or statistical processing. Rule-based analysis can include analyzing each key child segment using one or more rules. For some rules, audio engine 208 may analyze energy levels or energy level transitions of segments. For example, a first rule that is based on a pre-set duration can be that segments including a burst of energy at or above the pre-set duration are identified as cries or screams and not vocalizations, but segments including bursts of energy less than the pre-set duration are classified as vocalizations. An example of one pre-set duration is three seconds based on characteristics commonly associated with vocalizations and cries. FIG. 5 illustrates energy levels of sound in a segment associated with the key child and showing a series of consonant (/b/) and vowel (/a/) sequences. Using a pre-set duration of three seconds, the bursts of energy indicate a vocalization since they are less than three seconds.

A second rule can be classifying segments as vocalizations that include formant transitions from consonant to vowel or vice versa. FIG. 5 illustrates formant transitions from consonant /b/ to vowel /a/ and then back to consonant /b/, indicative of canonical syllables and, thus, vocalizations. Segments that do not include such transitions may be further processed to determine a classification.

A third rule can be classifying segments as vocalizations if the formant bandwidth is narrower than a pre-set bandwidth. In some embodiments, the pre-set bandwidth is 1000 Hz based on common bandwidths associated with vocalizations.

A fourth rule can be classifying segments that include a burst of energy having a first spectral peak above a pre-set threshold as cries. In some embodiments, the pre-set threshold is 1500 Hz based on characteristics common in cries.

A fifth rule can be determining a slope of a spectral tilt and comparing it to pre-set thresholds. Often, vocalizations include more energy in lower frequencies, such as 300 to 3000 Hz, than higher frequencies, such as 6000 to 8000 Hz. A 30 dB drop is expected from the first part of the spectrum to the end of the spectrum, indicating a spectral tilt with a negative slope and a vocalization when compared to pre-set slope thresholds. Segments having a slope that is relatively flat may be classified as cries since the spectral tilt may not exist for cries. Segments having a positive slope can be classified as vegetative sounds.

A sixth rule can be comparing the entropy of the segment to entropy thresholds. Segments including relatively low entropy levels may be classified as vocalizations. Segments having high entropy levels can be classified as cries or vegetative sounds due to randomness of the energy.

A seventh rule can be comparing segment pitch to thresholds. Segments having a pitch between 250 to 600 Hz may be classified as vocalizations. Segments having a pitch of more than 600 Hz can be classified as cries or squeals, and a pitch of less than 250 Hz can be classified as growls.

An eighth rule can be determining pitch contours. Segments having a rising pitch may be classified as happy sounds. Segments having a falling pitch can be classified as angry sounds.

A ninth rule can be determining the presence of consonants and vowels. Segments having a mix of consonants and vowels may be classified as vocalizations. Segments having all or mostly consonants can be classified as vegetative sounds or fixed-signal sounds.

A rule according to various embodiments can be implemented separately or concurrently with other rules. For example, in some embodiments audio engine 208 (FIG. 3) can implement one rule only while, in other embodiments, audio engine 208 (FIG. 3) can implement two or more rules.

Statistical processing can be performed in addition to or alternatively to the rule-based analysis.

Statistical processing can include processing segments with a MD-GMM using 2000 or more Gaussians in which models are created using Mel-scale Frequency Cepstral Coefficients (MFCC) and Spectral Subband Centroids (SSC). MFCCs can be extracted using a number of filter banks with coefficients. In one embodiment, 40 filter banks can be used with 36 coefficients. SSCs can be created using filter banks to capture formant peaks. The number of filter banks used to capture formant peaks can be 7 filter banks in the range of 300 to 7500 Hz. Other statistical processing can include using statistics associated with one or more of the following segment characteristics:
  Formants;
  Formant bandwidth;
  Pitch;
  Voicing percentage;
  Spectrum entropy;
  Maximum spectral energy in dB;
  Frequency of maximum spectral energy; and
  Spectral tilt.
Statistics regarding the segment characteristics can be added to the MFCC-SSC combinations to provide additional classification improvement.

As a child ages, characteristics associated with each key child segment category can change due to growth of the child's vocal tract. In some embodiments, an age-dependent model can be used in addition or alternatively to the techniques described above to classify key child segments. For example, vocalization, cry, and fixed-signal/vegetative-sound models can be created for each age group. In one embodiment, 12 different models are used with Group 1 corresponding to 1 to 2 months old, Group 2 corresponding to 3 to 4 months old, Group 3 corresponding to 5 to 6 months old, Group 4 corresponding to 7 to 8 months old, Group 5 corresponding to 9 to 10 months old, Group 6 corresponding to 11 to 12 months old, Group 7 corresponding to 13 to 14 months old, Group 8 corresponding to 15 to 18 months old, Group 9 corresponding to 19 to 22 months old, Group 10 corresponding to 23 to 26 months old, Group 11 corresponding to 27 to 30 months old, and Group 12 corresponding to 31 to 48 months old. In an alternative embodiment, vocalization, cry, and fixed-signal/vegetative-sound models may be created for each month of age from 1 month to 48 months. This model can include 144 models, 48 models for each category. Alternative embodiments can use a different number of groups or associate different age ranges with the groups.

In a number of embodiments, the cry-related segments can include any segment that is labeled as key child with the subcategory labeled as cry, and any segment that is labeled otherwise can be considered a non-cry segment. In other embodiments, other suitable segmenting and/or segment labeling approaches can be used. In many embodiments, the segments extracted from the datasets of audio data can include information about the start time of the segment, the end time of the segment, the duration (e.g., time length) of the segment, the average decibel (dB) sound pressure level of the segment, the peak dB sound pressure level of the segment, and/or other suitable information about the segment. In many embodiments, the average dB sound level of the segment can be determined by converting the dB values in the segment to sound power level (SPL) for averaging. For example, with certain recording or audio capture systems with an offset of 97, the conversion can be performed as follows:

$$dB\text{-PowerLevel}=10**((\text{Stored-dB}+97)/10)$$

$$dB\text{-SPL}=\text{Round}(100*(10*\text{Log }10(dB\text{-PowerLevel})))/100$$

Returning to FIG. 4, in several embodiments, method 400 additionally can include a block 415 of determining a plurality of periods of the plurality of cry-related segments that satisfy one or more threshold non-sparsity criteria. As an example, the determining of block 415 can be performed by device 200 (FIG. 3). In many embodiments, the plurality of periods can be separated by gaps of at least a first time-duration threshold without any cry-related segments. In some embodiments, the first time-duration threshold can be approximately 15 seconds to approximately 5 minutes. For example, in some embodiments, the first time-duration threshold can be approximately 30 seconds, such that the periods are separated by gaps of at least 30 seconds without any cry-related segments. In many embodiments, the period will start and end with a cry-related segment, which will be the same segment in the case of a period with a single cry-related segment. To illustrate, the first period can start with the first cry-related segment and will include any cry-related segments that occur within 30 seconds of each other without a gap of at least 30 seconds without a cry-related segment. Any gap of 30 seconds or more between cry-related segments will start a new period. In many embodiments, the cry-related segments are grouped into these periods sequentially. Often, the cry-related segments in the periods are non-continuous, and a period can have a number of cry-related segments as well as a number of non-cry-related segments. As an example, a period can include segments labeled in the following order: cry, cry, cry, noise (dog bark), cry, cry, female adult (mom soothing), cry, vegetation (intake of air by key child), cry, cry, cry, cry, female adult (mom soothing), cry, female adult (mom soothing), cry, other child, cry, other child, vegetation (intake of air by key child), cry, cry, cry, cry, noise (dog bark), cry, cry, female adult (mom soothing), cry, cry, vegetation (intake of air by key child), cry, silence, cry, cry.

Some of the periods can include only one or a limited number of cry-related segments, and such "sparse" periods can be filtered out by applying the one or more threshold non-sparsity criteria. In many embodiments, the periods that remain after applying the threshold non-sparsity criteria can be non-sparse periods of interest that are consequential.

In many embodiments, the one or more threshold non-sparsity criteria can include a first non-sparsity criterion in which each of the plurality of periods that satisfies the first non-sparsity criterion has a period duration longer than a second time-duration threshold. In some embodiments, the second time-duration threshold can be approximately 10 seconds to approximately 5 minutes. For example, in some embodiments, the second time-duration threshold can be set to 30 seconds, such that any period that is shorter than 30 seconds is filtered out. In many embodiments, this first non-sparsity criterion can advantageously ensure that the period is long enough to have sufficient context data to be used in the classification performed in block 420, as described below in further detail.

In a number of embodiments, the one or more threshold non-sparsity criteria can include a second non-sparsity criterion in which each period of the plurality of periods that satisfies the second non-sparsity criterion has an aggregated cry duration that exceeds a third time-duration threshold. In many embodiments, the aggregated cry duration for each period can be an aggregate of durations of the plurality of cry-related segments within the period. In several embodiments, the third time-duration threshold can be approximately 5 seconds to approximately 30 seconds. For example, each of the cry-related segments in the period can have a duration, and these durations can be aggregated across the period to determine the aggregated cry duration of the period. In some examples, the third-time duration threshold can be 15 seconds, such that any periods in which the aggregated cry duration is less than 15 seconds are filtered out. In many embodiments, this second non-sparsity criterion can beneficially ensure that the period has enough cry segments to be considered non-sparse. In many embodiments, the third-time duration threshold can be adjusted based on the second-time duration threshold. In other embodiments, other threshold non-sparsity criteria can be used.

In several embodiments, the periods that are filtered out by the threshold non-sparsity criteria are not used in the classification performed in block 420, as described below in further detail. The periods that do satisfy the threshold non-sparsity criteria can be classified in block 420, as described below in further detail. Grouping cry-related segments into non-sparse periods can advantageously eliminate insubstantial cries and facilitate examining cry-related segments in a way that essentially averages the cry-related segments in a period to improve statistical analysis and performance. In many embodiments, a period can be a quasi- or reasonably-homogenous time sequence that can be further classified in block 420, as described below in further detail.

Figure 6:
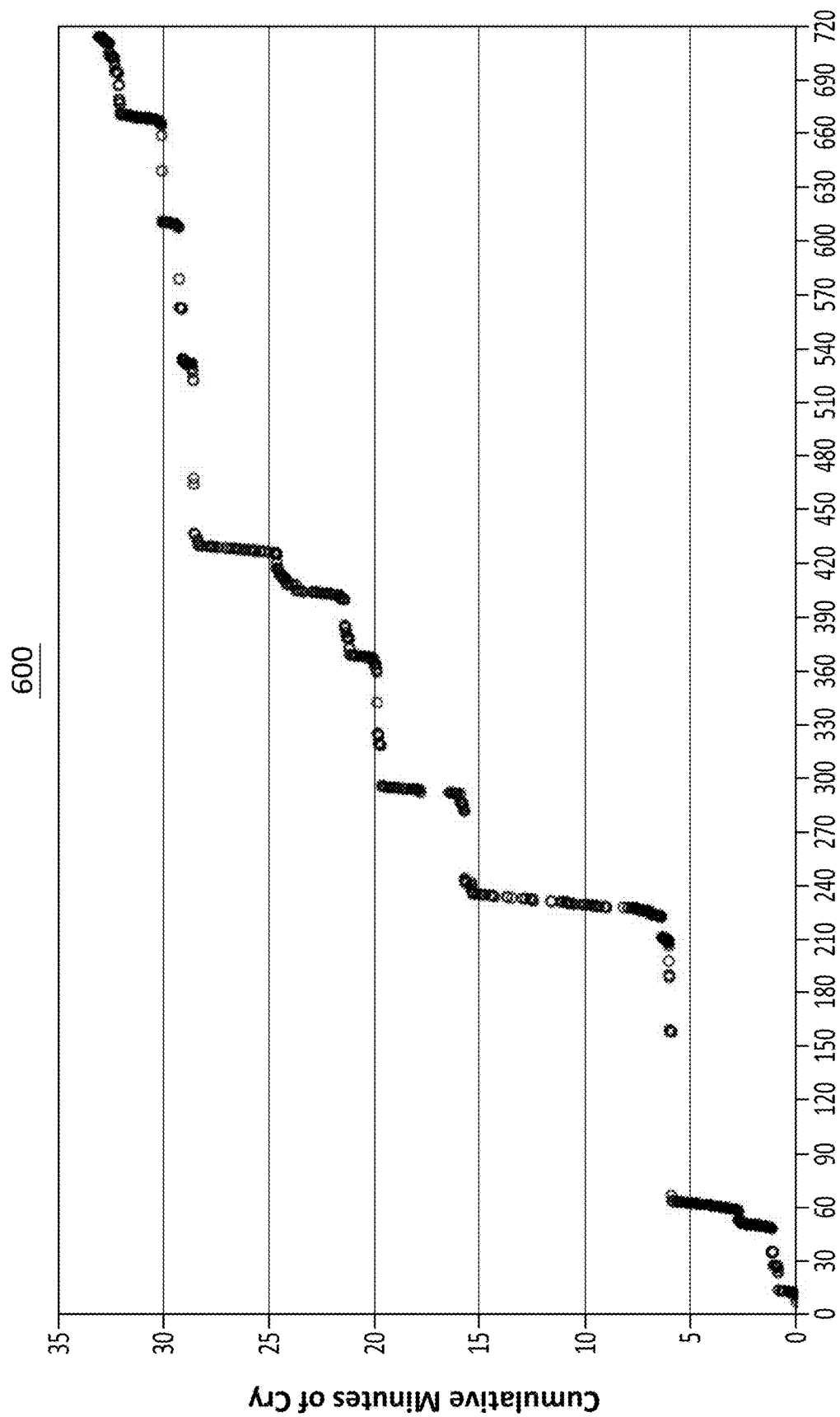
FIG. 6 illustrates a cry-related segment plot showing a circular symbol for each cry-related segment of the digital audio dataset based on the elapsed capture time at which the cry-related segment occurs and the cumulative minutes of cry at which the cry-related segment occurs.

Turning ahead in the drawings, FIG. 6 illustrates a cry-related segment plot 600 showing a circular symbol for each cry-related segment that is labeled as such over a 720-minute (12-hour) audio recording, based on the elapsed capture time at which the cry-related segment occurs, and the resulting cumulative minutes of cry at which the cry-related segment occurs. As can be seen in FIG. 6, some regions of the cry-related segments are denser than others, and the slope or steepness of the staircase pattern varies over time.

Figure 7:
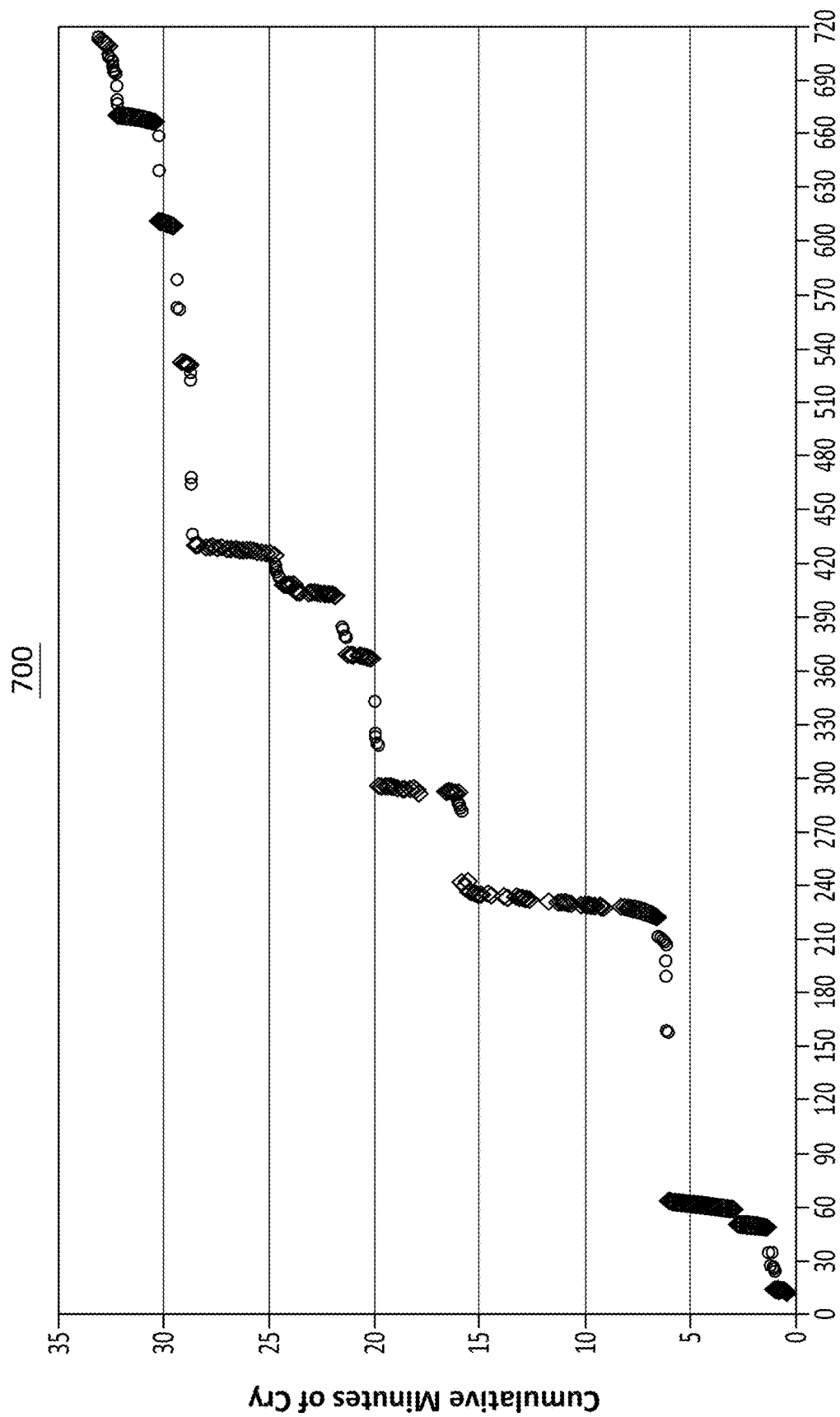
FIG. 7 illustrates a cry-related segment plot in which the cry-related segments from FIG. 6 that are part of periods that satisfy the threshold non-sparsity criteria are labeled with a diamond symbol, and the other cry-related segments FIG. 6 that are filtered out by the non-sparsity criteria are labeled with a circular symbol.

Turning ahead to the next drawing, FIG. 7 illustrates a cry-related segment plot 700 in which the cry-related segments from cry-related segment plot 600 (FIG. 6) that are part of periods that satisfy the threshold non-sparsity criteria are labeled with a diamond symbol, and the other cry-related segments from cry-related segment plot 600 (FIG. 6) that are filtered out by the non-sparsity criteria are labeled with a circular symbol.

Returning to FIG. 4, in a number of embodiments, method 400 further can include a block 420 of performing a classification on the plurality of periods to classify each of the plurality of periods as either a cry period or a fussiness period. In many embodiments, the classification can be a machine-learning algorithm that is based on labeled training data. For example, the training data can be periods that are labeled by expert listeners who have analyzed the periods in the training data. As an example, the performing of block 420 can be performed by device 200 (FIG. 3).

In some embodiments, one or more features (e.g., predictor variables) can be identified from the periods and/or other characteristics of the dataset of audio data or characteristics of the key child, which can be used in the machines learning classification algorithm. In many embodiments, one or more of the features can be period parameters. In various embodiments, various metrics related to the period can be calculated. For examples, the metrics can include the duration of the period, the aggregated cry duration of the period, the number of cry-related segments in the period, the mean and/or median duration of the cry-related segments in the period, the mean and/or median duration of the gaps of non-cry-related segments within the period, or other suitable metrics. One or more of these metrics can be used as a feature in the classification algorithm, or other suitable metrics can be used. For example, one of the features can be a slope of the period. The slope of the period can be based on the aggregate cry duration in the period relative to the total duration of the period. The slope of the period can be viewed as the steepness of the cry-related segments in the period in the cry-related segment plots (e.g., 600 (FIG. 6), 700 (FIG. 7)). As another example, another one of the features can be a median dB-SPL of the period. The median dB-SPL of the period can be the median of the average dB-SPL for all of the cry-related segments in the period. In other embodiments, other and/or additional period parameters can be used as features in the classification algorithm.

In a number of embodiments, one or more of the features can be audio dataset parameters. For example, the total number of periods across the dataset of audio data, including the periods that satisfy and the periods that do not satisfy the threshold non-sparsity criteria, can be a feature used in the classification algorithm. In other embodiments, other and/or additional suitable audio dataset parameters can be used as features in the classification algorithm.

In several embodiments, one or more of the features can be child parameters. For example, the gender of the key child and/or the age (e.g., days of age) of the key child can be features in the classification. In other embodiments, other and/or additional suitable child parameters can be features in the classification algorithm.

In some embodiments, performing the classification on the plurality of periods can include applying a binary logistic regression model on features of the plurality of periods. For example, the binary logistic regression model can use one or more of the features (i.e., predictor variables) described above to classify each period as either a cry period or a fussiness period. In several embodiments, the features of the plurality of periods used in the binary logistic regression model can include the slope of the period, as described above, and the median decibel sound pressure level (dB-SPL) of the period, as described above. In many embodiments, the features also can include the total number of periods across the dataset of audio data, as described above, the gender of the key child, and the age of the key child. In other embodiments, other suitable features can be used in a binary logistic regression model. In other embodiments, another suitable machine learning classification algorithm can be used. For example, in some embodiments, a neural network classification can be used to classify each of the periods as either a cry period or a fussiness period. In other embodiments, a classification algorithm can assign other classifications to periods in addition to cry or fussiness, e.g., mixed cry and fussiness periods.

To evaluate this approach, a test was performed in which key child cry segments were extracted from 64 audio recordings of 41 children ages 81-120 days old (11-17 weeks old) to create a dataset of labeled training data (21 of the children had more than one recording). From this dataset were identified 138 audio clips of periods that satisfied the threshold non-sparsity criteria described above (i.e., first time-duration threshold=30 seconds, second time-duration threshold=30 seconds, third time-duration threshold=15 seconds). 88% of the periods were determined to be sparse, and were filtered out, and 12% of the periods satisfied the threshold non-sparsity criteria. Yet these non-sparse periods accounted for 58% of the total duration of all the periods (both sparse and non-sparse), meaning that the non-sparse periods tended to be fairly short in duration. Also, the non-sparse periods included 75% of the total duration of all cry-related segments in the dataset, meaning that most of the cry-related segments were in the non-sparse periods. The human listener then identified homogeneous regions within these 138 non-sparse periods, and classified these regions within the periods as cry, fussiness, or other. The other category included sporadic cry as well as non-cry sounds, such as child vocalizing, mother talking, TV, dog whining, etc.). 108 of these clips were determined to be primarily (i.e., at least 55%) cry or fussiness. The 30 other clips were determined to be not sufficiently homogenous as cry or fussiness to be used in the training data. Specifically, 14 of these 30 other clips were determined to be primarily other (not primarily cry or primarily fussiness). The remaining 16 of these 30 other clips were determined to be not as homogenous as the other 108 clips.

Figure 8:
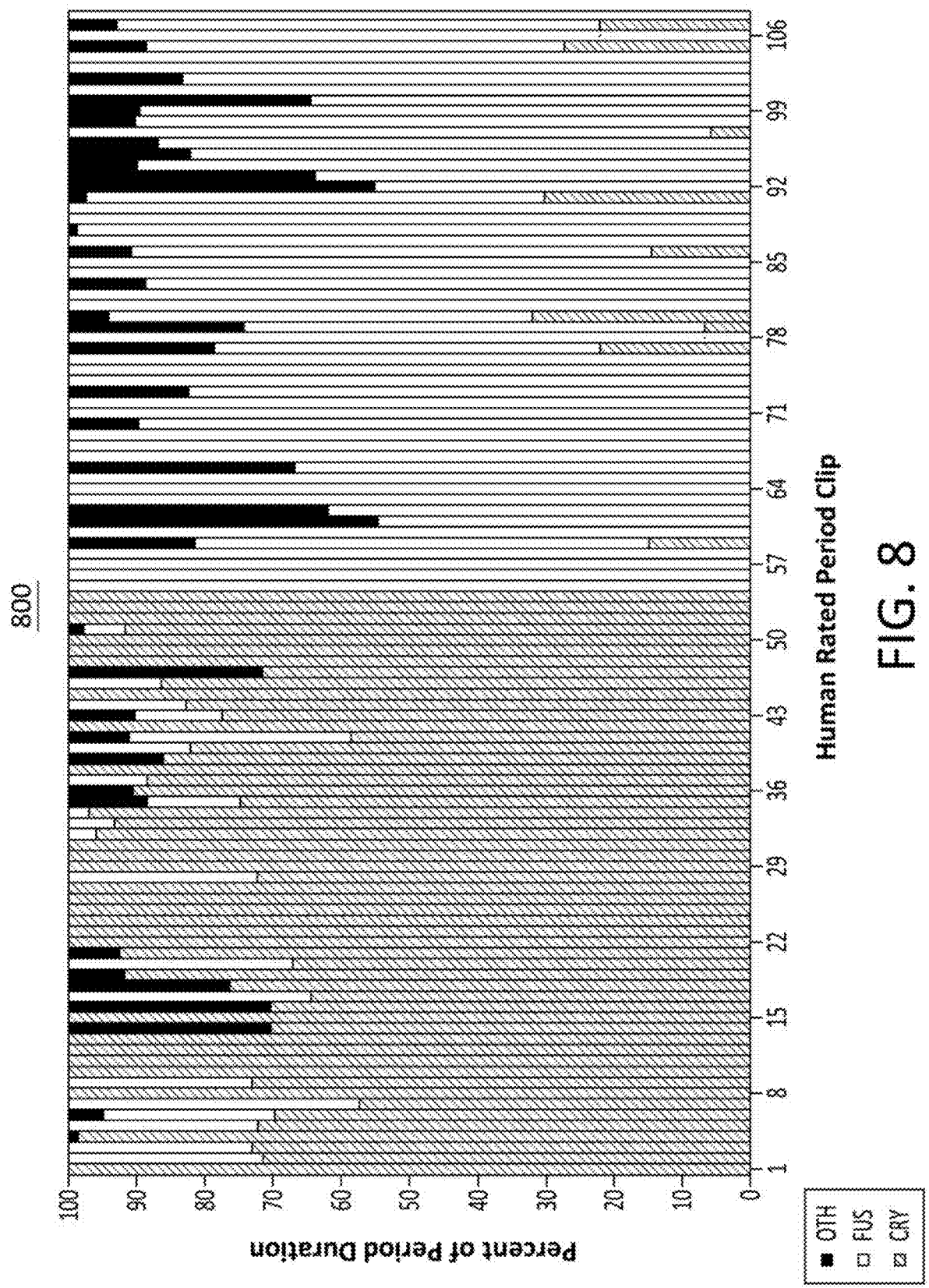
FIG. 8 illustrates a stacked bar chart showing human-labeled training clips based on the percentage of the duration of the cry (in diagonal), fussiness (in clear), and other (in solid) categories in each of the training clips.

Turning ahead in the drawings, FIG. 8 illustrates a stacked bar chart 800 showing the 108 training clips based on the percentage of the duration of the cry (in diagonal), fussiness (in clear), and other (in solid) categories in each of the training clips. As explained above, the categorization of the regions of each of the clips was performed by human listeners. These clips are arranged in FIG. 8 such that the clips that are primarily cry are shown on the left, and the clips that are primarily fussiness are shown on the right. As seen in FIG. 8, in most of these clips, there are at least two of the categories, and in several clips, all three categories are found.

Using the five features described above (the slope of the period, the median decibel sound pressure level (dB-SPL) of the period, the total number of periods across the recording, the gender of the key child, and the age of the key child, a binary logistic regression model was applied to each human-labeled training data period (108 clips) to generate log odds that the period is a cry period. Based on the training data, the binary logistic regression model output the log odds classifier shown in Equation 1:

Log Odds=−45.4640+20.0381*Slope+0.7785*Median Average dB SPL−4.9238*(Gender=Male)− 3.7381*Child Age−0.0975*Total Periods  (Eq. 1)

The probability that the period is a cry period can then be determined from the Log Odds as shown in Equation 2:

Cry Probability=EXP(Log Odds)/(1+EXP(Log Odds))  (Eq. 2)

To test this classifier, the classifier was applied to the 138 human-labeled clips, and the threshold probability was set at just below 0.5, such that those periods with a probability above the threshold probability were labeled as cry periods, and those periods with a probability below the threshold probability were labeled as fussiness periods. As described earlier, 14 of the 138 human-labeled clips (or 10%) were primarily other and not primarily cry or primarily fussiness. These are False Positive, or Type I errors. These errors generally resulted from segment labeling errors, such as dog whining or electric toothbrush hum being mistaken for key child cry. Thirteen of these 14 clips were classified as fussiness periods, and the other clip was classified as a cry period using this classifier model, indicating that it was rare for the classifier to falsely identify a period of interest as a cry period.

For the remaining 124 human-labeled clips, the confusion matrix for the classifier is shown below in Table 1, which indicates balanced performance. Specifically, the sensitivity, meaning the probability of the classifier predicting cry when it is truly cry was 90%. The specificity, meaning the probability of the classifier predicting fuss when it is truly fuss was 92%. The positive predictive power (PPP), meaning the number of true cry periods versus the number of cry periods so called by the classifier was 92%. The negative predictive power (NPP), meaning the number of true fuss periods versus the number of fuss periods so called by the algorithm was 91%.

TABLE 1

|  | Predicted Cry | Predicted Fuss | Total |  |
|---|---|---|---|---|
| Observed Cry | 55 | 6 | 61 | 90% Sensitivity |
| Observed Fuss | 5 | 58 | 63 | 92% Specificity |
| Total | 60 | 64 | 124 |  |
|  | 92% PPP | 91% NPP |  | 91% Overall Accuracy |

Figure 9:
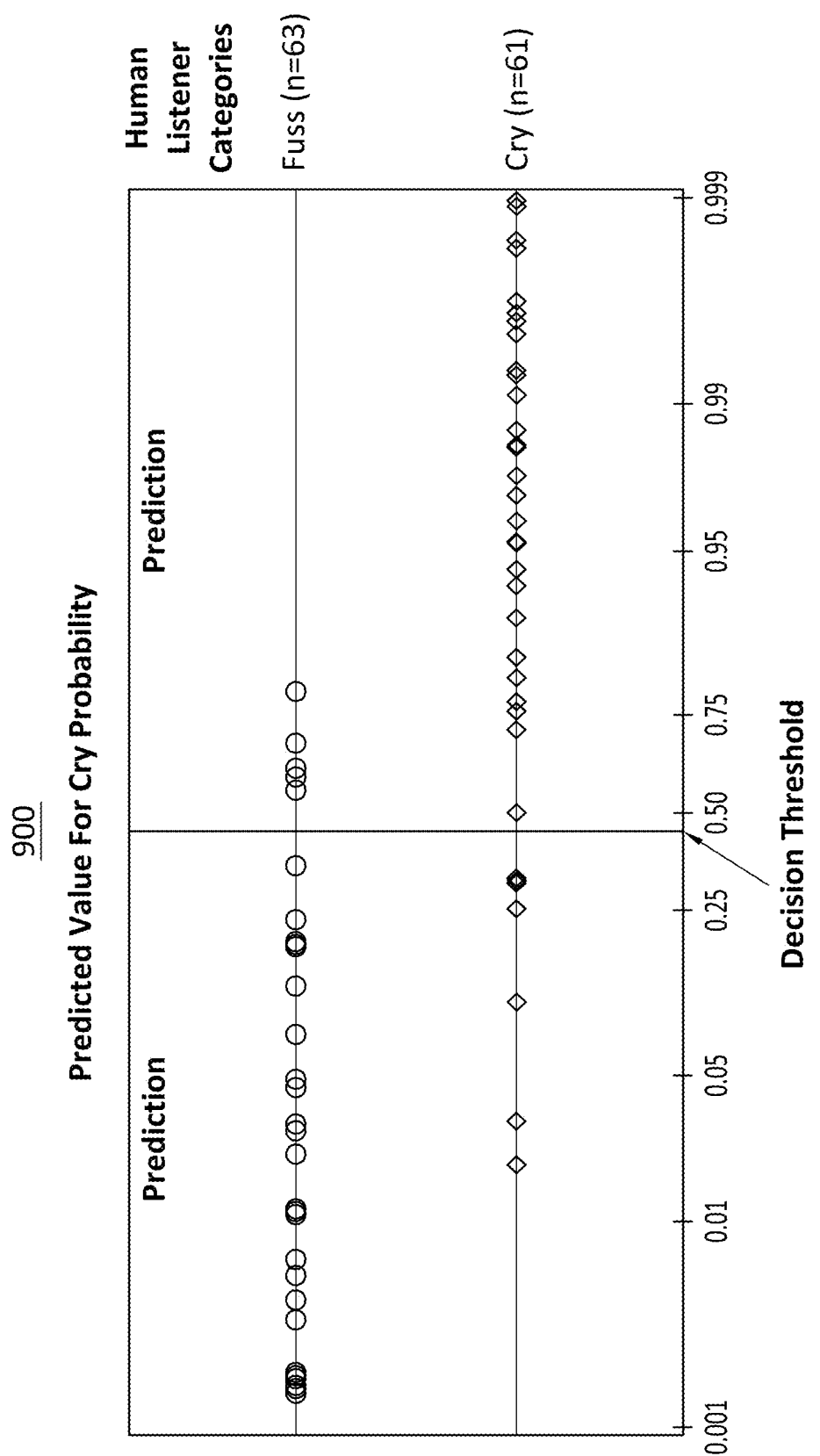
FIG. 9 illustrates a probability chart showing the predicted value for cry probability across the human-labeled clips, separated into two rows, on an expanded probability axis.

Turning ahead to the next drawing, FIG. 9 illustrates a probability chart 900 showing the predicted value for cry probability across the 124 human-labeled clips, separated into two rows, on an expanded probability axis. The top row shows the predicted values for the 63 clips that were labeled as fuss by the human listener, and the bottom row shows the predicted values for the 61 clips that were labeled as cry by the human listener. The decision threshold was set to slightly less than 0.5, which was done to achieve a balanced (quasi-equal) error rate.

Figure 10:
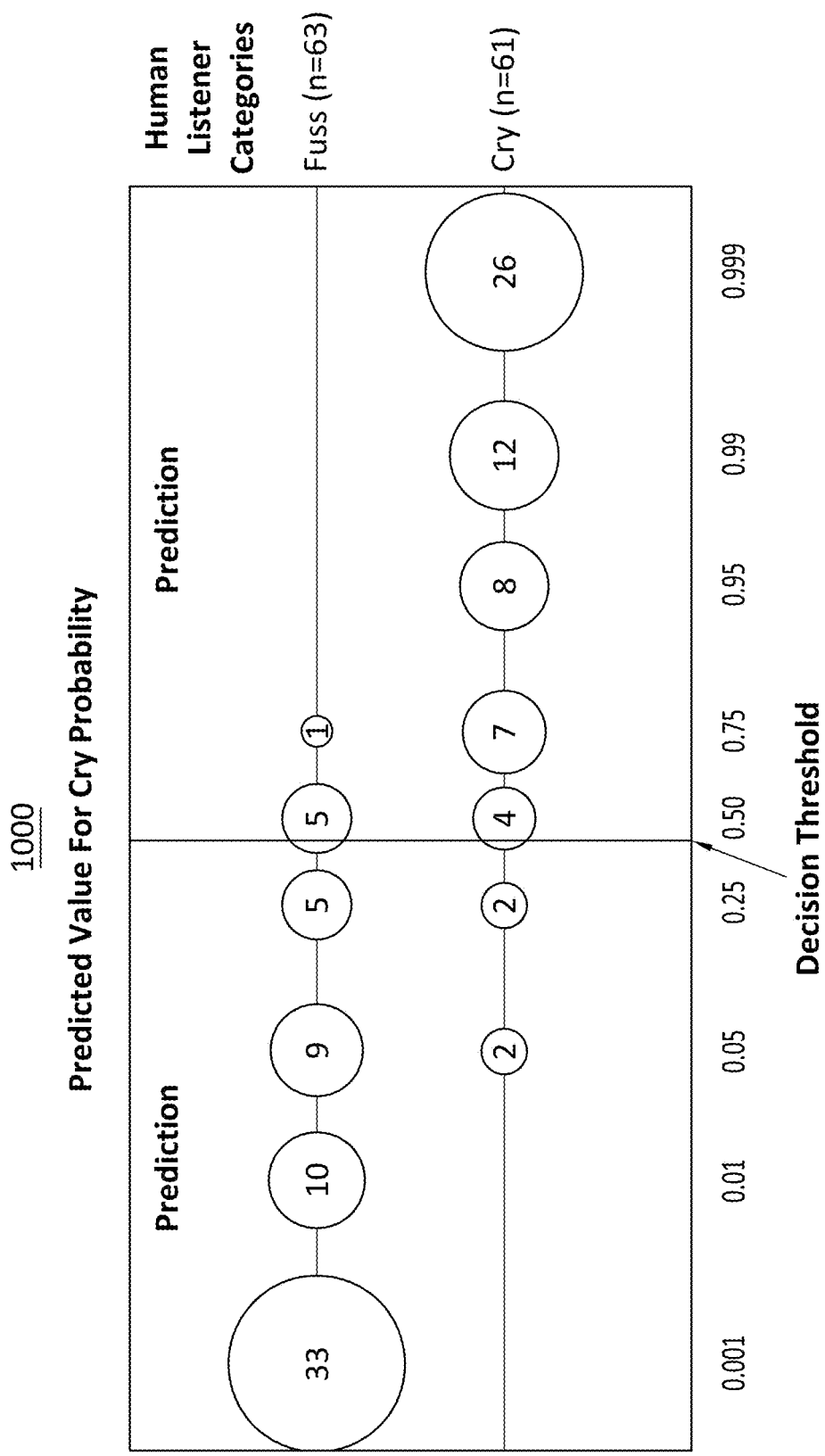
FIG. 10 illustrates a bubble frequency chart showing the predicted value for cry probability across the human-labeled clips, separated into two rows, on an expanded probability axis, using bubble frequency.

Turning ahead to the next drawing, FIG. 10 illustrates a bubble frequency chart 1000 showing the predicted value for cry probability across the 124 human-labeled clips, separated into two rows, on an expanded probability axis, using bubble frequency. FIG. 10 provides an alternate way of viewing the data in FIG. 9. Like FIG. 9, the top row shows the predicted values for the 63 clips that were labeled as fuss by the human listener, and the bottom row shows the predicted values for the 61 clips that were labeled as cry by the human listener. As shown in FIG. 10, the clips are grouped at various probability levels with the size of the circle corresponding to the frequency of the clips that fall within the probability level. FIG. 10 shows that the classifier provided good separation between the two classifications of fussiness and cry, as the majority of the cases are at or near the two extreme ends of the probability axis.

Figure 11:
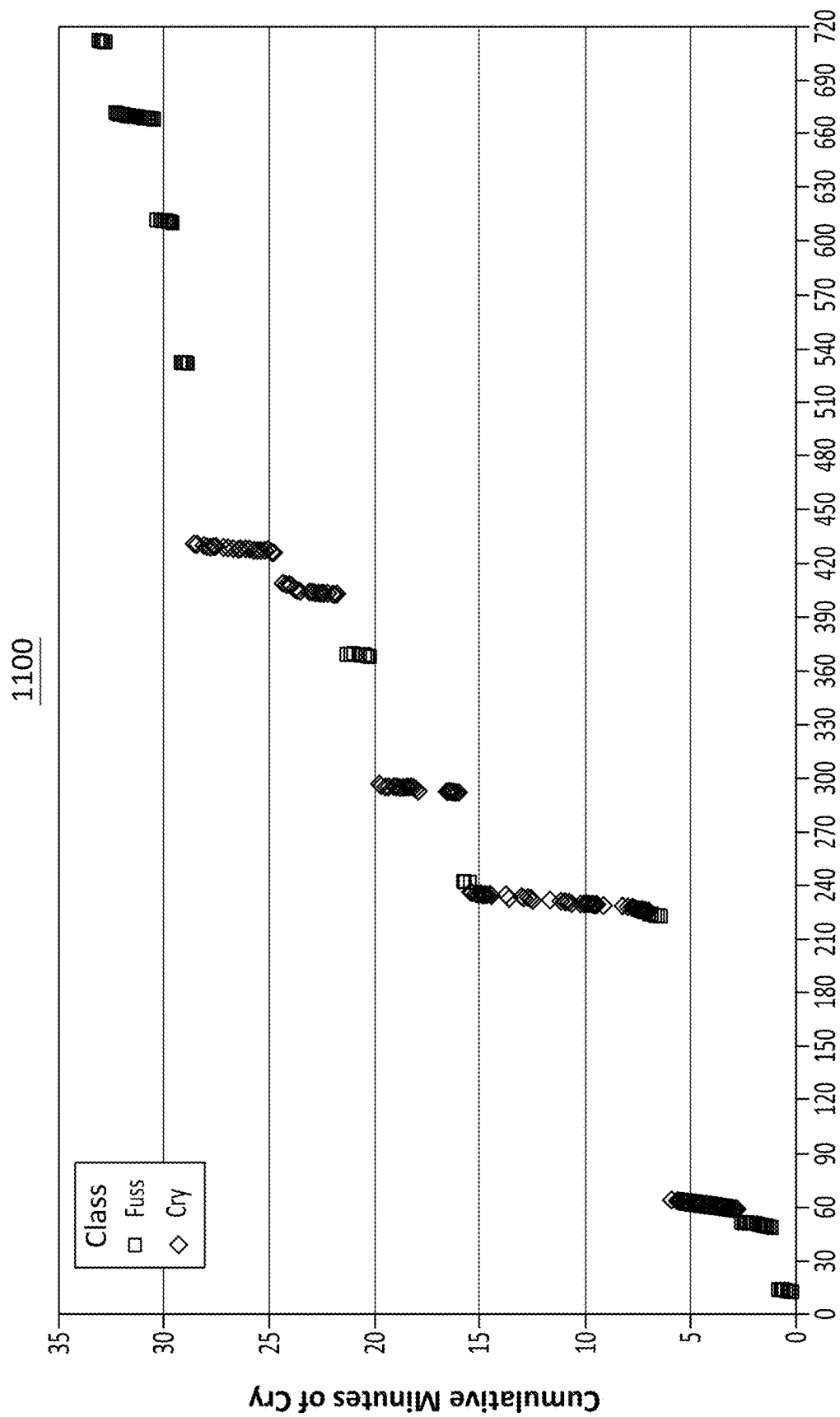
FIG. 11 illustrates a cry-related segment plot in which the cry-related segments that are part of periods that satisfy the threshold non-sparsity criteria in FIG. 7 (shown as the diamond symbols in FIG. 7), are classified using the binary logistic regression model as either part of a cry period (and labeled with diamond symbols) or as part of a fussiness period (labeled with square symbols).

Turning ahead to the next drawing, FIG. 11 illustrates a cry-related segment plot 1100 in which the cry-related segments that are part of periods that satisfy the threshold non-sparsity criteria in FIG. 7 (shown as the diamond symbols in FIG. 7), are classified using the binary logistic regression model described above as either part of a cry period (and labeled with diamond symbols) or as part of a fussiness period (and labeled with square symbols). In other words, each cry-related segment in a period is coded with a symbol according to the classification of the period of which it is a part. Based on the features used in the classifier, general trends show that, on the one hand, cry probability increases for steeper slope, higher median dB-SPL, fewer total periods, gender as male, and younger age. On the other hand, general trends show that fussiness probability increases for gentler slope, lower median dB-SPL, more total periods, gender as female, and older age.

Returning in the drawings to FIG. 4, in several embodiments, method 400 optionally can include a block 425 of outputting metrics based on the classification of the plurality of periods. Metrics can include any quantifiable value that uses the classification of the periods. For example, the metrics can include the number of periods classified as cry periods and/or fussiness periods, the total duration of the periods classified as cry periods and/or fussiness periods, the total duration of the cry-related segments in the periods classified as cry periods and/or fussiness periods, the number of cry-related segments in segments in the periods classified as cry periods and/or fussiness periods, and/or other suitable metrics. In addition, the output can include information such as the date and time of the collection of the dataset of audio data, the duration of the dataset of audio data, the age and/or gender of the key child, period-level details about the features, and/or other suitable metrics.

As an example, the outputting of block 425 can be performed by device 200 (FIG. 3). In many embodiments, audio engine 208 (FIG. 3) can output the metrics to output device 214 (FIG. 3). For example, audio engine 208 (FIG. 3) can, in response to a command received from input device 212 (FIG. 3), output a metric associated with the classification of the periods and/or the cry-related segments. In many embodiments, the systems and methods described herein can beneficially provide objective consistency in quantifying the amount of cry from a key child, which can be used to diagnose infantile colic more accurately and/or to assess whether an intervention (e.g., medicine, a change in diet, etc.) is effective at mitigating infantile colic.

Although automatic determination of cry segments and discrimination of cry from fussiness has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
receiving one or more datasets of audio data of a key child captured in a natural sound environment of the key child;
segmenting each of the one or more datasets of audio data to create labeled audio segments, the labeled audio segments comprising labeled cry-related segments and labeled non-cry segments;
determining periods each comprising a respective aggregation of the labeled cry-related segments and the labeled non-cry segments within a respective period duration that is longer than a second time-duration threshold and in which the labeled cry-related segments satisfy a non-sparsity criterion; and
performing a classification on the periods to classify each of the periods as either a cry period or a fussiness period.

2. The system of claim 1, wherein the computing instructions are further configured to perform:
outputting metrics based on the classification of the periods.

3. The system of claim 1, wherein the periods are separated by gaps of at least a first time-duration threshold without any of the labeled cry-related segments.

4. The system of claim 3, wherein the first time-duration threshold is approximately 15 seconds to approximately 5 minutes.

5. The system of claim 1, wherein the labeled cry-related segments are each no more than approximately 1.0 second long.

6. The system of claim 1, wherein the second time-duration threshold is approximately 10 seconds to approximately 5 minutes.

7. The system of claim 1, wherein:
the non-sparsity criterion is that a respective aggregated duration of the labeled cry-related segments within each of the periods exceeds a third time-duration threshold.

8. The system of claim 7, wherein the third time-duration threshold is approximately 5 seconds to approximately 30 seconds.

9. The system of claim 1, wherein the one or more datasets of audio data of the key child comprise datasets of audio data in which the key child is less than 4 months old.

10. The system of claim 1, wherein performing the classification on the periods comprises:
applying a binary logistic regression model on features of the periods.

11. A method being implemented via execution of computing instructions configured to run on one or more processors and stored on one or more non-transitory computer-readable media, the method comprising:
receiving one or more datasets of audio data of a key child captured in a natural sound environment of the key child;
segmenting each of the one or more datasets of audio data to create labeled audio segments, the labeled audio segments comprising labeled cry-related segments and labeled non-cry segments;
determining periods each comprising a respective aggregation of the labeled cry-related segments and the labeled non-cry segments within a respective period duration that is longer than a second time-duration threshold and in which the labeled cry-related segments satisfy a non-sparsity criterion; and performing a classification on the periods to classify each of the periods as either a cry period or a fussiness period.

12. The method of claim 11 further comprising:

outputting metrics based on the classification of the periods.

13. The method of claim 11, wherein the periods are separated by gaps of at least a first time-duration threshold without any of the labeled cry-related segments.

14. The method of claim 13, wherein the first time-duration threshold is approximately 15 seconds to approximately 5 minutes.

15. The method of claim 11, wherein the labeled cry-related segments are each no more than approximately 1.0 second long.

16. The method of claim 11, wherein the second time-duration threshold is approximately 10 seconds to approximately 5 minutes.

17. The method of claim 11, wherein:

the non-sparsity criterion is that a respective aggregated duration of the labeled cry-related segments within each of the periods exceeds a third time-duration threshold.

18. The method of claim 17, wherein the third time-duration threshold is approximately 5 seconds to approximately 30 seconds.

19. The method of claim 11, wherein the one or more datasets of audio data of the key child comprise datasets of audio data in which the key child is less than 4 months old.

20. The method of claim 11, wherein performing the classification on the periods comprises:

applying a binary logistic regression model on features of the periods.

* * * * *